MAGNETIC DISC RECORDING AND REPRODUCING MACHINE

Filed April 2, 1964 9 Sheets-Sheet 1

ERLING P. SKOV &
CHARLES A. VOGEL
INVENTORS

BY Robert H. Clay

ATTORNEY

Nov. 5, 1968 E. P. SKOV ET AL 3,409,746

MAGNETIC DISC RECORDING AND REPRODUCING MACHINE

Filed April 2, 1964 9 Sheets-Sheet 2

ERLING P. SKOV &
CHARLES A. VOGEL
INVENTORS

BY Robert S. Clay

ATTORNEY

ERLING P. SKOV &
CHARLES A. VOGEL
INVENTORS

BY Robert G. Clay
ATTORNEY

MAGNETIC DISC RECORDING AND REPRODUCING MACHINE

Filed April 2, 1964 9 Sheets-Sheet 4

ERLING P. SKOV &
CHARLES A. VOGEL
INVENTORS

BY Robert G. Clay

ATTORNEY

ERLING P. SKOV &
CHARLES A. VOGEL
INVENTORS

BY Robert G. Clay

ATTORNEY

MAGNETIC DISC RECORDING AND REPRODUCING MACHINE

Filed April 2, 1964 9 Sheets-Sheet 6

ERLING P. SKOV &
CHARLES A. VOGEL
INVENTORS

BY Robert G. Clay

ATTORNEY

MAGNETIC DISC RECORDING AND REPRODUCING MACHINE

ERLING P. SKOV &
CHARLES A. VOGEL
INVENTORS

BY Robert S. Clay

ATTORNEY

Nov. 5, 1968 E. P. SKOV ET AL 3,409,746

MAGNETIC DISC RECORDING AND REPRODUCING MACHINE

Filed April 2, 1964 9 Sheets-Sheet 8

ERLING P. SKOV & CHARLES A. VOGEL
INVENTOR.

BY Robert G. Clay

ATTORNEY

MAGNETIC DISC RECORDING AND REPRODUCING MACHINE

Filed April 2, 1964 9 Sheets-Sheet 9

ERLING P. SKOV &
CHARLES A. VOGEL
INVENTORS

BY Robert H. Clay

ATTORNEY

United States Patent Office 3,409,746

Patented Nov. 5, 1968

3,409,746

MAGNETIC DISC RECORDING AND REPRODUCING MACHINE

Erling P. Skov, San Mateo, and Charles A. Vogel, Sunnyvale, Calif., assignors to Ampex Corporation, Redwood City, Calif., a corporation of California Filed Apr. 2, 1964, Ser. No. 356,813

24 Claims. (Cl. 179—100.2)

ABSTRACT OF THE DISCLOSURE

A magnetic recording disc is inserted into a slot, tripping an automatic cueing mechanism for rotating the disc to a predetermined orientation. When the operator is ready, he operates a recording or playing control, which causes the disc to be clamped to a rotating turntable, and a magnetic transducing head to be lowered to engage the disc and to move along a radial path, so as to trace a spiral track on the disc. Reproduction of a recorded signal always begins instantly and accurately, because the disc has been cued to the same predetermined orientation and to the same initial portion of the same spiral track that was used during recording.

This invention relates to magnetic recording and reproducing machines, and particularly to such machines adapted for the use of rotating record discs.

Previously in the art of recording information magnetically upon flat plastic sheets, either an apparatus has been used in which the recording head moves in a spiral or other pattern while the sheet is fixed in position, or an apparatus has been used in which the sheet is formed as a disc and is caused to rotate, while the head is mounted on a fixed track and moved radially with respect to the rotating disc. For certain purposes the first arrangement may be preferable, but it demands that the complicated electromagnetic head mechanism be controlled for movement both in rotation and radial motion. The second arrangement requires only that the head be controlled for movement radially. Thus many problems, such as that of commutating the electrical signals, are avoided, and a machine having performance of higher quality can be constructed for equal cost.

In constructing a machine of the magnetic disc type, one of the major problems is to cause radial movement of the head and rotational movement of the disc with coordinated accuracy so that the head follows a correct spiral path on the disc. This problem is not so acute in wax disc phonograph machines, because at least in the reproducing phonograph machine, the reproduce needle is mechanically guided in a pre-formed groove in the disc, and thus needs no other coordination.

Another pair of problems not found in wax-disc phonographs is that of "cueing," i.e., of starting the reproducing head at the exact beginning of the recorded spiral track on the disc, and similarly, the problem of automatically "cueing" the disc on the machine before play, so that when it is desired to begin play, the head starts without delay at the beginning of the track.

Another problem is that of ensuring that the plane of the head gap is always aligned with a radius of the disc in order that the angle of the gap plane to the record track (or tangent thereto) is not altered to produce a "skew" effect as the head moves radially inwardly.

Another problem is that of ensuring the correct head-to-disc pressure for best recording and reproducing, and the correct penetration of the head into the disc to cause this pressure.

Another problem is that of causing fully automatic operation of the machine and requiring of the operator only a manual insertion and removal of the disc, together with selection of the operating mode to be used.

In relation to such automatic operation, it is often desirable to use machines of this type for playing short "spot announcements" in radio stations or on public address systems. In such uses, it may be further desirable to arrange a number of such machines for fully automatic sequential play.

Accordingly it is an object of the present invention to provide a magnetic disc recording and reproducing machine having improved structure for guiding the transducing head in a correct spiral path on the disc.

A further object of the invention is to provide a ma- for ensuring that the plane of the transducing head gap is always aligned with a radius of the disc.

It is a further object of the invention to provide a machine as above described including improved means for obtaining the most satisfactory head-to-disc pressure.

It is a further object of the invention to provide a machine as above described and capable of automatically cueing the disc upon insertion so as to begin the recording or reproduction at the same predetermined point on the disc.

A further object of the invention is to provide a machine as above described in which the reproduction mode is automatically stopped at the precise end of a recorded message on the disc, and in which the functioning of the apparatus is automatic to the extent of requiring only a manual insertion and removal of the disc by the operator and selection of the operating mode to be used.

It is a further object of the present invention to provide a machine as above described and suitable for playing short "spot announcements," and particularly arranged for connection with a number of other such machines for fully automatic sequential play.

These and other objects of the invention are attained in a structure into which a disc is inserted, tripping an automatic mechanism for cueing the disc, comprising a rotating turntable and a cueing bar that drops into a cueing hole in the disc when the disc has rotated to its correct position, thereafter holding the disc in this position. When the operator is ready, he initiates the recording or playing operation, causing the cueing bar to be lifted and the disc to be clamped solidly to the rotating turntable, while the transducing head is lowered to engage the disc, and a clutch is engaged to cause the head to move along a track toward the center of the disc, driven by the clamping system and the turntable.

A better understanding of the invention may be had by reference to the following description, taken in conjunction with the accompanying drawings, in which.

Figure 2:
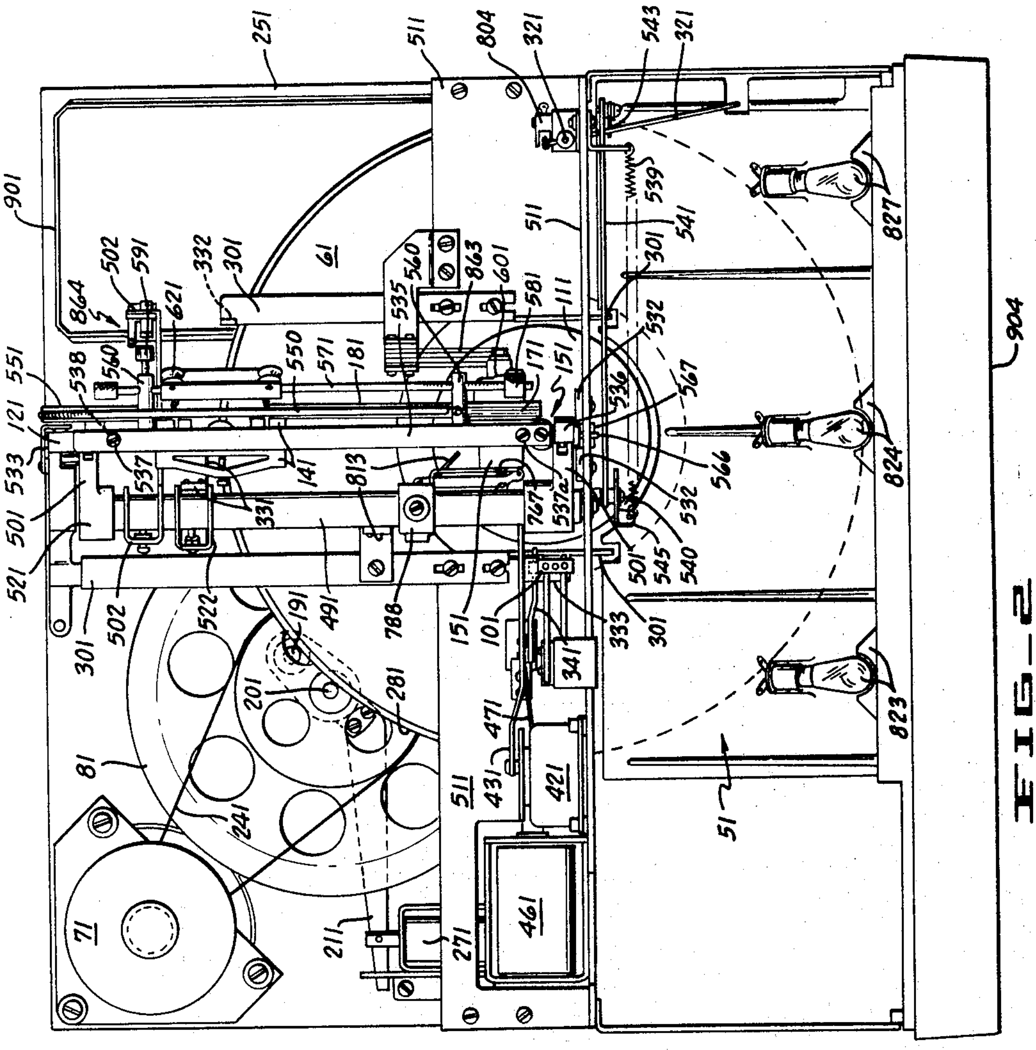
FIGURE 2 is a plan of the machine shown in FIGURE 1.
Figure 8:
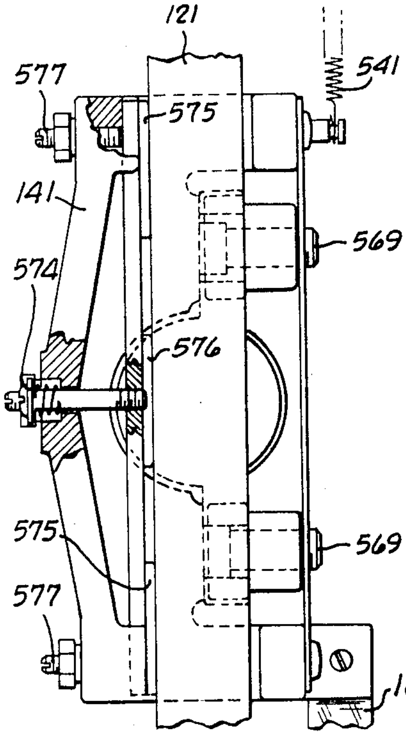
Figure 9:
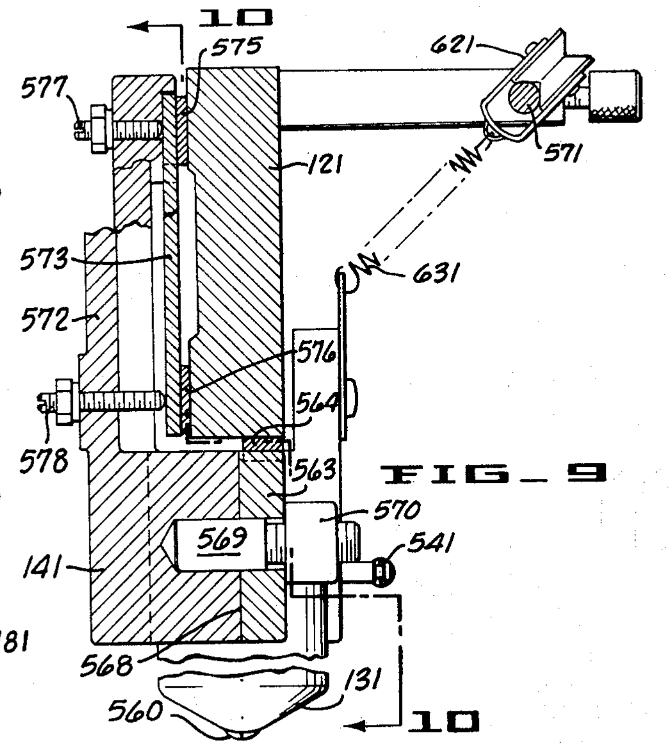

FIGURES *7a*–*7c* are a group of three schematic figures showing various positions in the operation of a portion of the apparatus;

FIGURE 8 is a plan to an enlarged scale of a portion of the apparatus shown in FIGURE 2;

FIGURE 9 is a cross-section of the apparatus of FIG-

Figure 13:
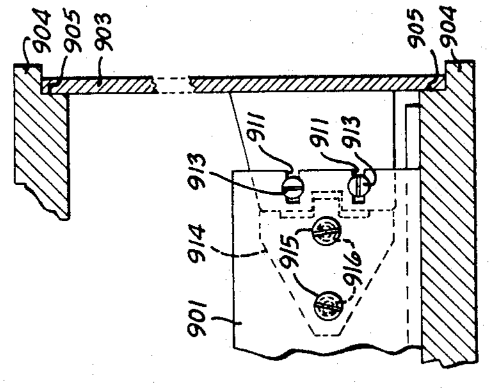
Figure 3:
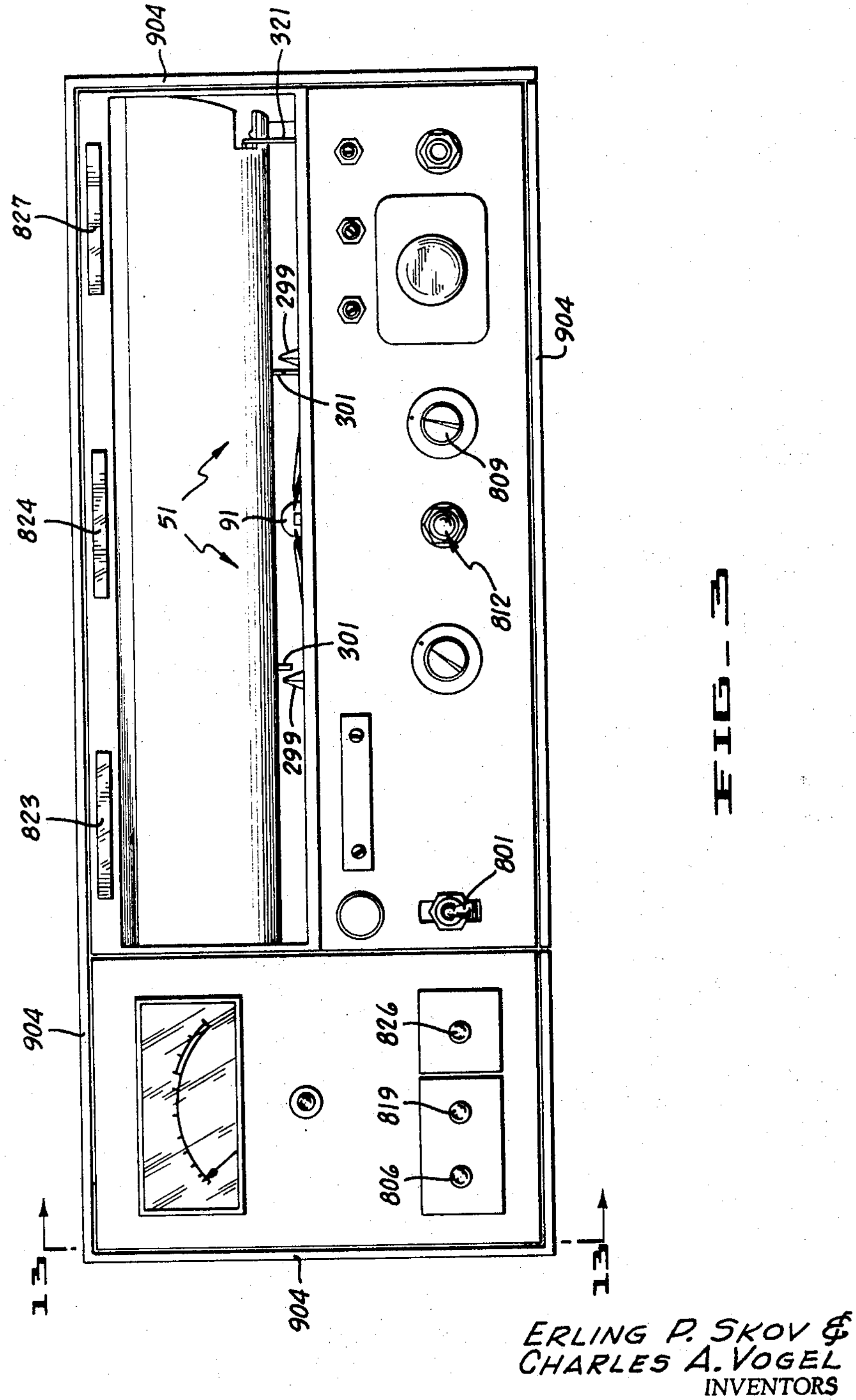
FIGURE 3 is a front elevation to an enlarged scale of the machine of FIGURE 1.
Figure 4:
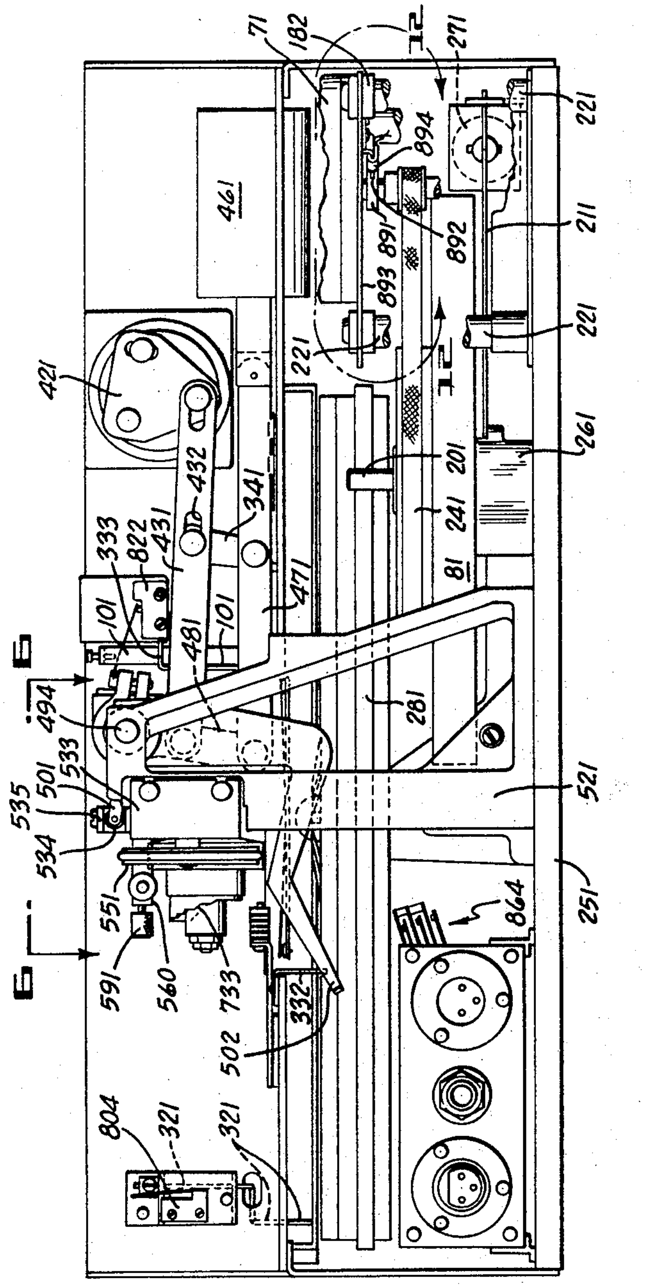
FIGURE 4 is a rear elevation to an enlarged scale of the machine of FIGURE 1.
Figure 5:
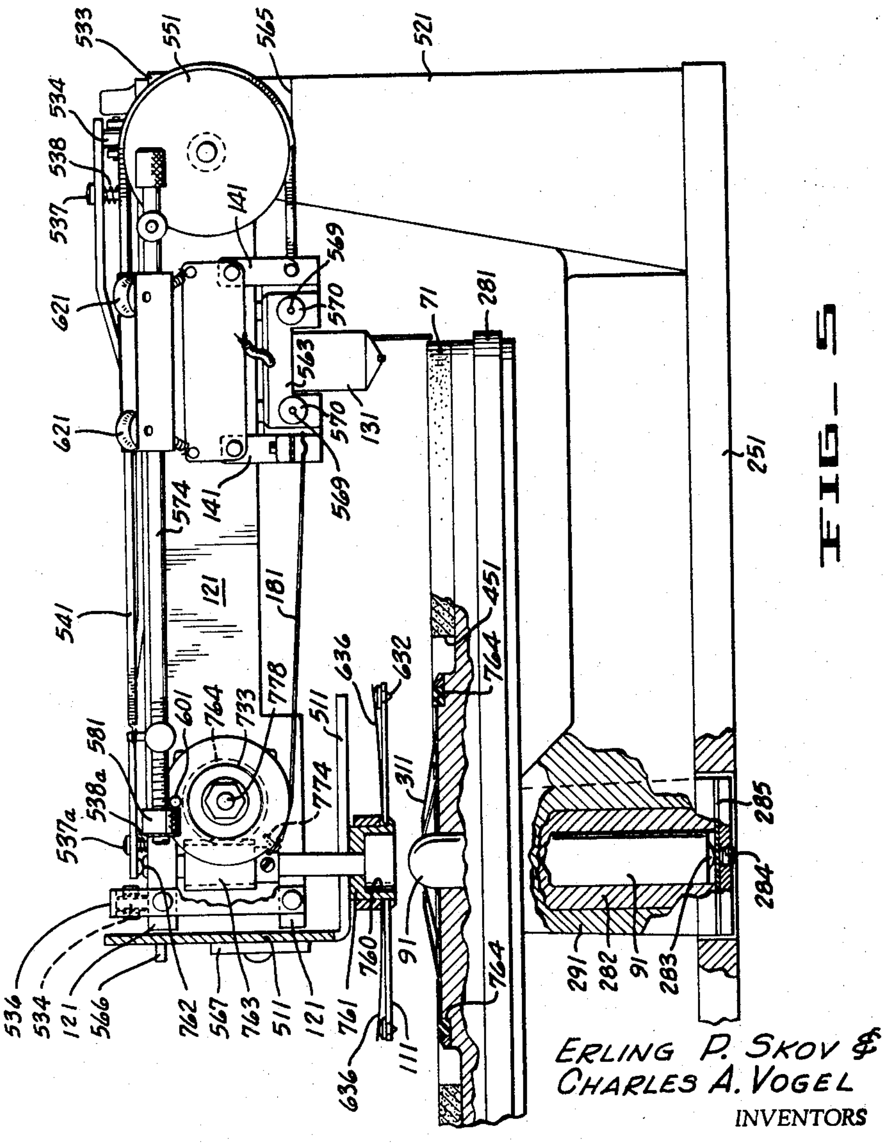
FIGURE 5 is a broken away side elevation of portions of the machine to an even larger scale.
Figure 12:
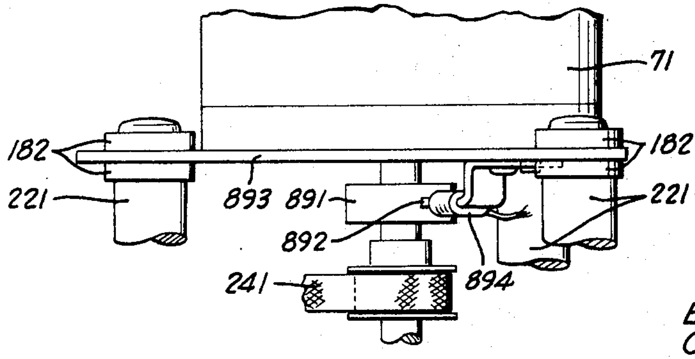
Figure 10:
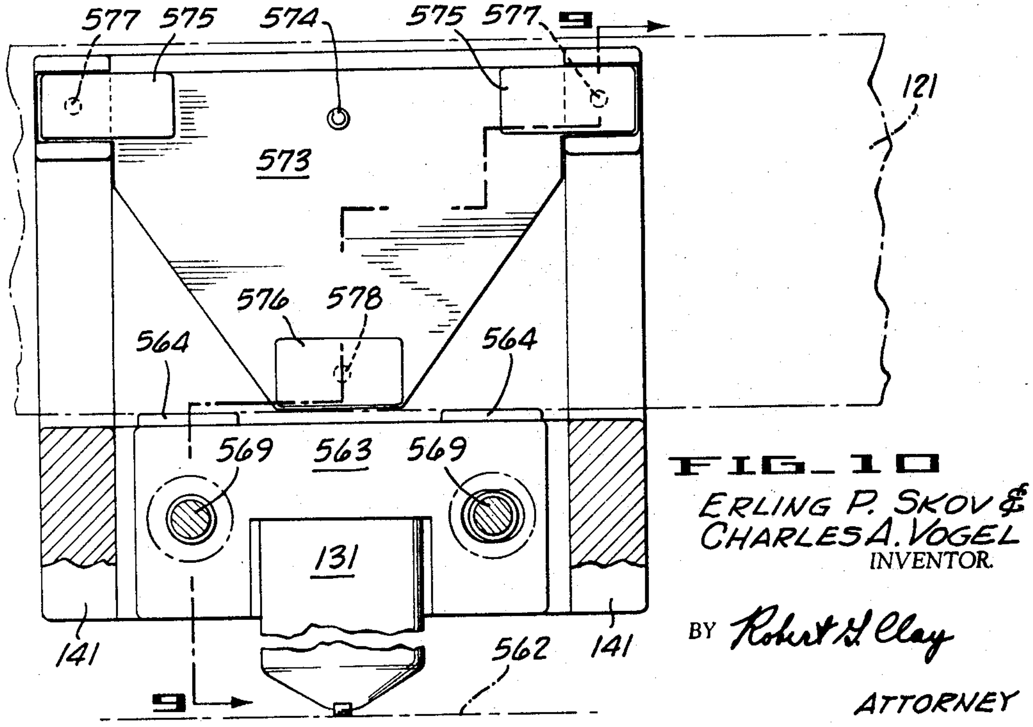
Figure 11:
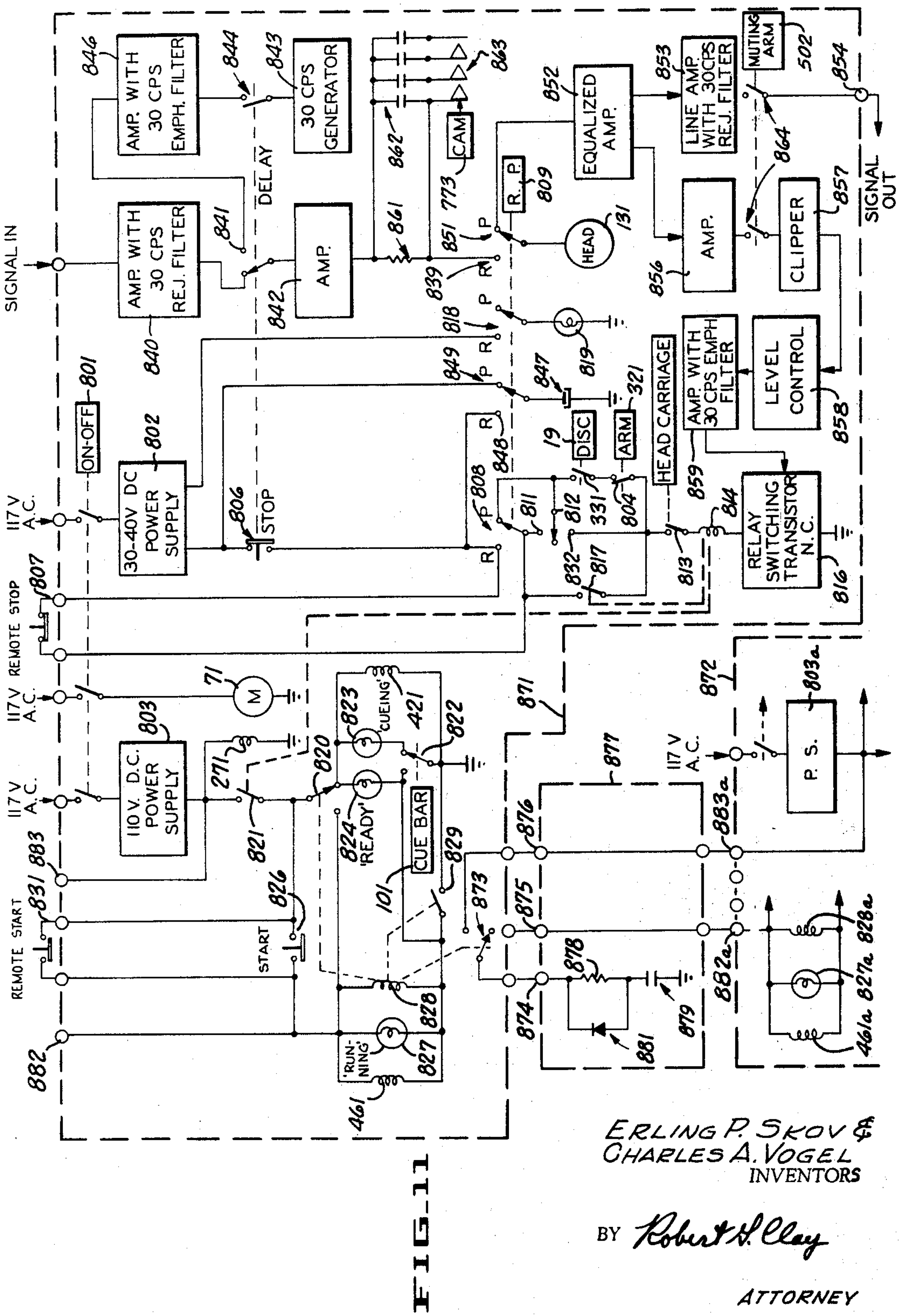

URE 8 and taken substantially on the plane of lines 9—9 of FIGURE 10;

FIGURE 10 is a side elevation of a portion of the apparatus of FIGURE 8 and taken substantially on the plane of lines 10—10 of FIGURE 9;

FIGURE 11 is a circuit diagram showing the control system of the invention;

FIGURE 12 is a broken away plan of a portion of the apparatus to an enlarged scale and taken substantially on the plane of lines 12—12 of FIGURE 4; and FIGURE 13 is a sectional elevation to an enlarged scale of a portion of the apparatus taken substantially on the plane of lines 13—13 of FIGURE 3.

As shown in FIGURES 1 through 4, the apparatus of the invention includes a machine 18 for recording and reproducing a signal on a thin plastic disc 19 that is coated with magnetic material. For properly positioning the disc 19 in the machine at the beginning of operation, the disc is provided with an index means, here shown as a cueing slot 21, located eccentrically therein, and a center locating hole 31. As here shown, the cueing slot 21 is positioned 90° counter-clockwise of the desired starting point 41 of the record track spiral 42 on the disc. The machine 18 has a forwardly opening tape chute 51 into which the disc may be inserted and guided to its proper position on a turntable 61, which is continuously driven by a motor 71 and flywheel 81 and in turn imparts rotary motion to the disc 19. A shaft 91, centrally and integrally formed with the turntable 61, has a rounded tip that fits into the center locating hole 31 of the disc 19 so that the disc rotates about its true center. For angular positioning, the disc is rotated until a cueing bar 101 falls into the cueing slot 21, at which time the disc stops, with the beginning 41 of the record track directly beneath a transducing head 131. When it is desired to begin the actual recording or playing, a clamping plate 111 is lowered to clamp the disc to the turntable 61, and the bar 101 is raised. The disc then begins to rotate with the turntable, and the plate 111 also. The plate 111 is arranged to drive the head 131 along a rail 121 across the disc with the head gap on a radial plane of the disc. The head is mounted on a carrier 141 which in turn rides on the rail 121. The coupling between the plate 111 and head is through a worm gear reduction 151, which is driven by the clamping device 111, which is clamped to the disc 19 and turntable 61 and is therefore coupled for rotation with both. Worm gear 151 in turn drives one rotary driving member 161 of a clutch 161–171. The driven member 171 of this clutch is a pulley coupled to a flexible belt 181 made of the same material as the disc 19. One end of the belt 181 is attached to the periphery of pulley 171 of the clutch, and the other end of the belt 181 is attached to the head carrier 141, so that when the clutch 161–171 is engaged, the pulley section 171 rotates, winding up the belt 181 and thereby drawing the head carrier 141 and the attached head 131 along the rail 121 at a uniform and predetermined rate of speed. The result is that the head 131 follows an exact predetermined spiral path 42 on the rotating disc 19.

Motor 71 is a hysteresis synchronous motor mounted through shock mounts 182 and spacers 221 to motorboard 251. Pulley 231 transmits power through belt 241 to capstan flywheel 81. Capstan flywheel 81 is mounted on an arm or lever 211 for pivoting motion about a bearing 191 that extends from motorboard 251, to engage and disengage a capstan shaft 201 with the rim of turntable 61. The rim 281 of the turntable is formed of resilient material, such as rubber, for good frictional qualities, and the capstan cannot be left in pressurized engagement with this rim when the machine is not operating, or a "flat" will be produced in the rim. The capstan shaft 201 extends from the flywheel 81 and is journaled in a bearing housing 261 affixed to lever 211. The lever 211 is actuated by a drive motor solenoid 271. In this example, the motor speed, the motor pulley 231 diameter, the capstan shaft 201 diameter, and the turntable rim 281 diameter are in such ratio that the working rotational speed of the turntable is 12 r.p.m. (.2 r.p.s.). The turntable 61 is rigidly affixed to a central shaft 91 that extends downward into sleeve bearings 282 in turntable housing 291, the lower end of this shaft resting on and rotating with a single large steel ball 283 at the bottom of the housing bore. The ball 283 rests on a hardened plate 285. The vertical position of ball 283 is adjustable by means of an adjusting screw 284 bearing against the plate 285, for adjusting the vertical height of the turntable.

Chute 51 through which the disc 19 is inserted to bring it into operating position within the machine, is a single aluminum die cast form. The opening is slightly wider than the diameter of the tape disc 19. The vertical height of the opening is large at the front to facilitate the initial insertion of the disc 19, and tapers down rapidly further in, to a shallow slot to more accurately locate the disc 19.

Figure 6:
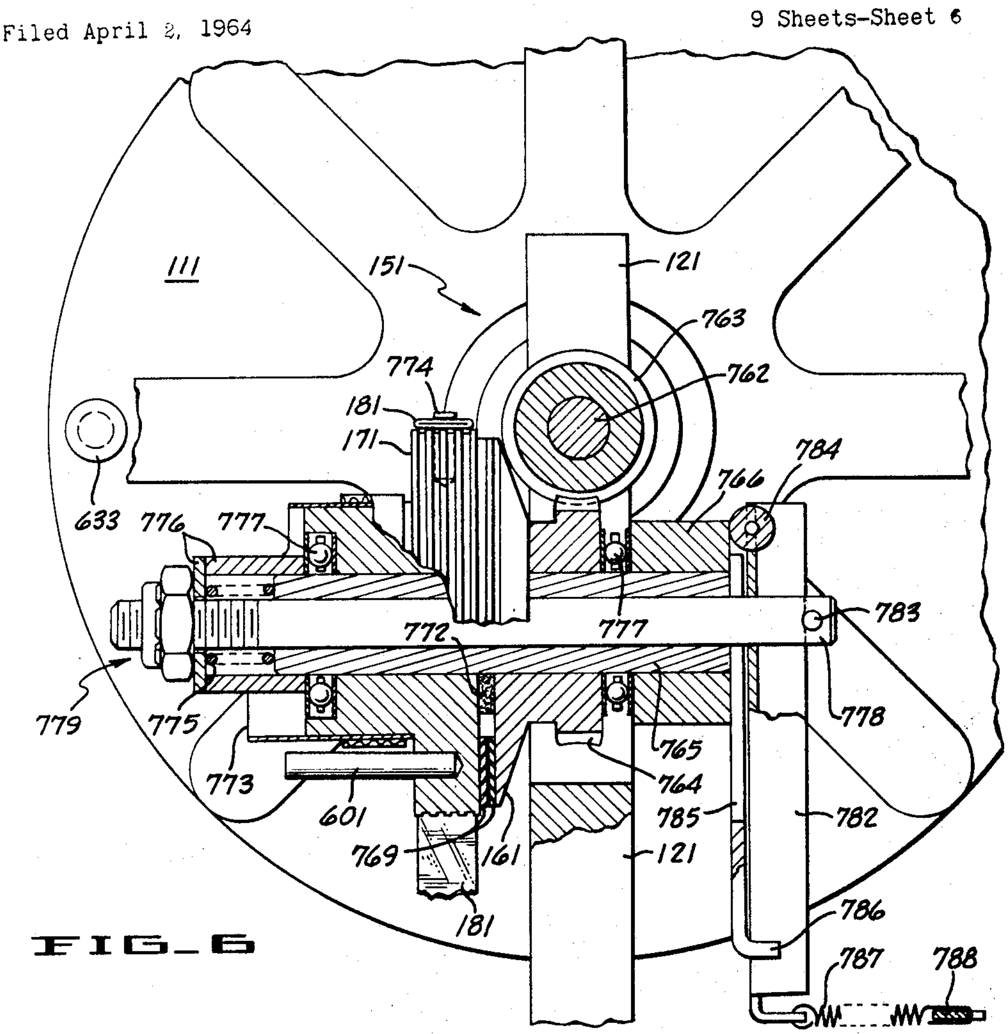
FIGURE 6 is a broken away plan of a portion of the machine to a still even larger scale and taken substantially on the plane of lines 6—6 of FIGURE 4.

The chute 51 is designed to perform the following functions. The chute guides the disc 19 at the sides so that the disc eventually comes to a position in which the central locating hole 31 is directly above the turnable center post 91. The chute guides the disc below all overhead parts and projections that might otherwise resist or stop the free insertion of the disc 19, such as the clamping device 111 and cueing device 101. The chute guides the disc 19 under the tapering under edges of a pair of top disc guides 301, which extend the top guiding function of the chute. The bottom surface of chute 51 is in close proximity to, but does not touch, the top surface of the turntable 61, and extends for approximately two inches, as here shown, inward over the turntable. This surface has a pair of tapered ridges 299 which support the front portion of the disc 19 after insertion with minimum frictional drag opposing the rotation of the disc. The ridges 299 thus prevent the disc 19 from encountering the surface of the rotating turntable 61 during the first part of insertion, they provide a stationary support for holding the front portion of the disc in spaced relation above the bottom surface of the chute 51 during and after play, to facilitate grasping the disc for later withdrawal, and they guide the disc during insertion onto the sloping surface of a central guide and lifting spring 311 (FIGURE 6). Another function of the opening of chute 51 is to assure the actuation of a microswitch arm 321, which is part of the control system later to be described. The arm 321 is actuated by pressure from the edge of the disc as the disc is withdrawn from the machine. Because of the restraining action of the left side of chute 51 the disc cannot avoid actuating this microswitch arm 321.

The two top disc guides 301 have the following functions. During the insertion of disc 19 the guides 301 act as a continuation of the top guiding surface of tape chute 51 to restrain the disc from rising upward to be stopped or snagged by overhead parts. The guides 301 guide the disc to a correct position for actuating a starting microswitch 331, which is also part of the control system later to be described. The back end of each guide 301 has a projection 332 that acts as a stop to prevent the disc from being inserted too far into the machine.

The central guide and lifting spring 311 performs the following functions. Spring 311 lifts the edge of the disc on insertion to avoid projections on the turntable, including the non-rounded portion of center post 91. Spring 311 collapses or flattens when the disc is clamped to the turntable 61 by the action of clamping disc 111, permitting the area around the center hole 31 of disc to descend to a position below the ball-shaped end of shaft 91, where this shaft is of full diameter and will most accurately position the disc in concentric relationship with turntable 61. After the disc has been played and unclamped, spring 311 raises the center position of the disc sufficiently to allow the edges of the hole 31 to contact shaft 91 where it is ball-shaped and presents no obstruction to the withdrawal of the disc.

The "cued" position of the disc is defined as follows. When the disc is concentrically located on turntable 61 the cueing slot 21 will at one point of its initial rotation pass directly under the lower end of the flat cueing bar 101. At this point of the rotation of the disc the starting point of the recording (or recorded) spiral is 90° in advance of the cueing slot 21 and bar 101, and is correctly aligned with the center (gap) line of the record-play head 131. Bar 101 may then drop into cueing slot 21 of disc to engage the anti-clockwise index edge of the slot 21 so that disc is held in this position as turntable 61 continues to rotate underneath it.

Figure 7A:
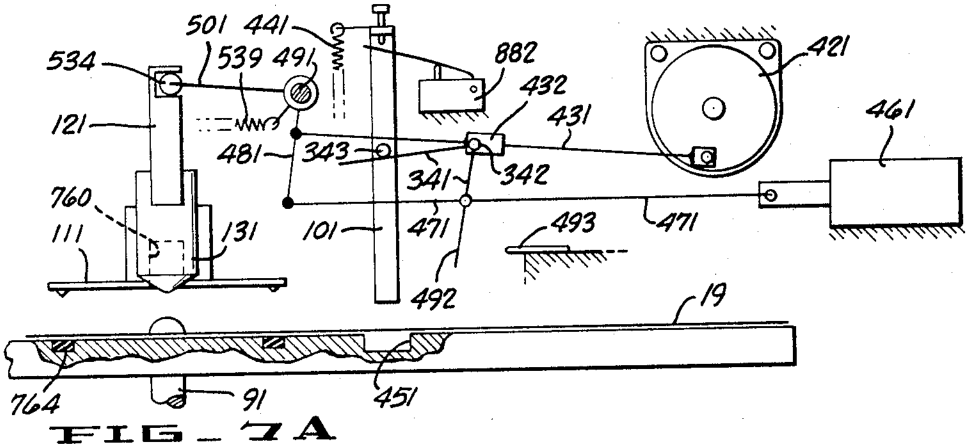
Figure 7B:
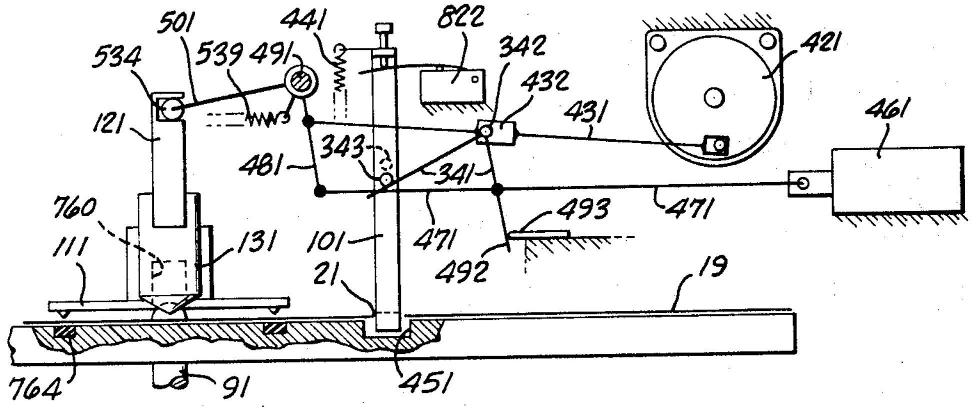
Figure 7C:
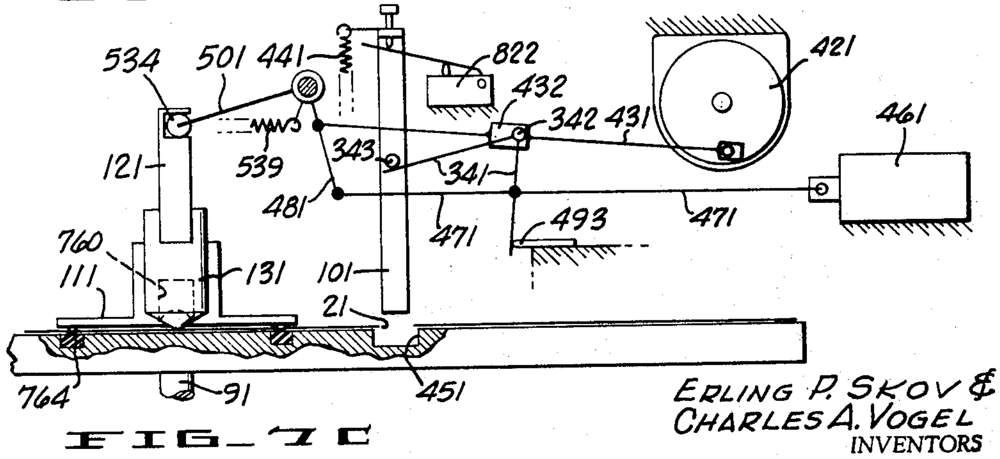

The parts of the cueing system are shown in FIGURE 7 as follows. Cueing bar 101 is a flat, narrow sheet metal bar that operates vertically in a slotted guide bracket 333 and is both narrower and thinner than cueing slot 21 of disc 19 so that it may freely pass through this slot. A cue bar lifter 341 is a sheet metal crank arm that is provided at the apex with a pin 342, and extends to cue bar 101 and beneath a pin 343 that projects from bar 341, so that pivoting action of lifter 341 causes or permits lifting or descent, respectively, of the bar. A rotary cueing solenoid 421 is provided, to the armature of which is attached a cueing solenoid link 431, and the pivot pin 342 of the cueing bar lifter is coupled for lost-motion action to the link 431 as by extension through a slot 432 of the link. The end of the link 431 is rotatably coupled to a crank arm 481, which is pivoted on the framework of the apparatus, and a second link 471 is coupled to the arm 481 at a greater radius. The other end of lifter 341 is pivoted to the link 471, completing a parallelogram linkage. When the disc 19 is first inserted in the machine, it closes starting microswitch 331 previously referred to. The closing of microswitch 331 causes the energization of cueing solenoid 421, which moves link 431 to the right as shown in the figure, pivoting crank arm 481 and moving link 471 even further to the right. This combined action of the two links 431, 471 causes a rotation of lifter 341 in a counter clockwise direction as shown in the figure, permitting cueing bar 101 to descend under the urging of gravity and of a tension spring 441 that is coupled between the bar and frame. The bar 101 descends until it rests upon the rotating disc 19, at least until the arrival of cueing slot 21, at which time the bar drops into the slot and into a turntable clearance groove 451, and the rotation of the disc is arrested, although rotation of the turntable continues.

The machine and disc may remain in this relative "cued" relationship for any length of time, pending decision by the operator to begin recording or playing. Upon such decision, a clamping solenoid 461 is energized, as later explained, and the cueing solenoid 421 is de-energized. The armature of clamping solenoid 461 is coupled to the link 471, and moves it further to the right, together with crank arm 481 and link 431. However, the lifter 341 has an extension 492, which during this action encounters a stop member 493, that is adjustably mounted on the framework of the apparatus. The lifter 341 is thus caused to rotate clockwise, taking advantage of the lost-motion connection to link 431, and the cueing bar 101 is lifted clear of the disc 19. At the same time, the disc is clamped to the turntable, for rotation therewith by plate 111 as hereinafter described.

The clamping action is produced by rotation of depressor bar 491 as by energization of clamping solenoid 461. The depressor bar 491 has sleeve bearings in each end and rotates about a long, rigidly mounted and stationary round steel rod 494 that is firmly attached at one end to a framework component mounting bridge 511 and at the other end to a depressor bar rear mounting bracket 521. A pair of depressor arms 501 are mounted on and rigidly attached to depressor bar 491, and a muting switch actuating arm 502 also extends from the bar 491 for a purpose to be later described.

The component mounting bridge 511 is a stationary bracket rigidly attached to the motorboard 251 and provides a mounting base for the solenoids and cueing components, as well as for the depressor bar 491 center bearing rod 494. The depressor bar rear mounting bracket 521 is rigidly mounted on the motorboard 251. To provide a solid mounting for the vertically moving portions of the apparatus, the rail 121 is mounted for vertical sliding motion in engagement with a pair of plastic track guides 532 mounted on the bridge 511, and in a track recess defined by the bracket 521 and a removable plate 533. The rail is raised and lowered by action of the depressors 501, which have mounted at their tips a pair of plastic rollers 534. The rollers 534 engage the top side of the rail and the bottoms of a pair of brackets 535 and 536 that are secured to the rail. One end of bracket 535 may be adjusted by means of bolt 537 and compression spring 538 to provide precisely the correct gap for operation of the associated roller 534. The other end of bracket 535 engages the upper end of worm gear and clamping disc shaft 762, and a second bolt 537*a* and spring 538*a* are provided to adjust the clamping pressure of the clamping disc. The rail and depressor assembly are loaded toward a retracted position (up) by means of a main tension spring 539 that is coupled to the front side of bridge 511 and to a bracket 545 that is mounted on a post 540 extending from crank arm 481 through an enlarged opening in the bridge 511. The bracket 545 has three different holes by which the spring 539 may be coupled to the bracket, so that the angle of pull and leverage exerted by the spring on the arm 481 may be varied. The post 540 also serves to connect the crank arm 481 to a link 541, which slides horizontally in a bracket 542 and operates to actuate the arm 321, for control purposes later to be described, as by engagement with the arm of a leaf spring 543 extending from the link 541, when the arm 481 is in the cued and operating positions. The rail 121 provides exact reference surfaces (tracks) to guide the head carrier 141 as it moves toward the center of the disc 19 in generating or scanning the spiral recording on the disc. The rail further provides a housing for and contains the worm gear reduction drive 151; acts as a carrier for clamping disc 111; acts as a carrier for clutch assembly 161 and 171 and for head carrier draw belt 181; acts as a carrier for a head carrier return spring assembly 550 and 551; and acts as a carrier for a head carrier spring slide assembly 561, 571, 581, 591, 621 and 631.

Clamping disc 111 has a number of downwardly extending plastic pins 632 for gripping the disc 19. The pins 632 fit slideably in holes in the disc 111 and are held in place by a spider spring 636, so as to be retractable when the disc 111 is lowered to clamping position; and in this position they bear through the disc 19 against a resilient ring 764. The disc 111 is mounted on a hub 761 and shaft 762 which rotates in journal holes located in the rail 121. The lower portion of hub 761 has a cavity 760 fitting over the shaft 91, and the hub extends below the plane surfaces of disc 111 and is chamfered so that on insertion of disc 19 the edge of disc 19 cannot be obstructed by hub 761. The disc 111 moves up and down with rail 121 as a unit, though it is otherwise free to rotate about its own axis. The axis of disc 111 is located in rail 121 so as to coincide exactly with the axis of turntable 61 so that when rail 121 and disc 111 are lowered, disc 111 rotates concentrically with turntable 61.

That portion of the upper surface of turntable 61 over which the head 131 travels during the play or record mode is a pad of resilient material of such thickness and quality as to hold disc 19 to the head 131 with an optimum pressure, which is determined by the height of and penetration by head 131 and disc 19 relative to and into this pad. Low pressure head to disc 19 contact, resulting from a higher relative position of head 131, would result in weakened or erratic playback or recording by head 131, and excessive pressure between head 131 and disc 19, resulting from a lower relative position of head 131, would result in possible speed variations of disc 19 and turntable 61 and excessive wear of both head 131 and tape disc 19. For these reasons the accurately maintained lowest height of rail 121 and head 131 is important.

The recess 760 in hub 761 has the function of ensuring alignment of the head gap precisely on a radial plane of the turntable, in conjunction with the other guiding elements, such as the plastic track guides 532, and the vertical guiding surface of rail rear bracket 521. This condition is of considerable importance in the maintenance of a continuous correct gap azimuth angle of head 131, in relation to disc 19, as it follows recorded or recording spiral 42 across the disc 19, because alignment of the head gap on other than an axial plane of the disc 19 would result in different gap angles with respect to the spiral track at its inner and outer ends.

As previously described, when the cueing operation is initiated depressor bar 491 is rotated to the intermediate cueing position and rail 121 is depressed a predetermined vertical distance, but less than the amount required to actually cause clamping disc 111 to clamp disc 19 to turntable 281. This partial rotation of depressor bar 491 and lowering of rail 121 performs the following additional functions. Starting microswitch 331 is attached to an arm 522 extending from depressor bar 491. Because microswitch 331 extends into the plane normally occupied by fully inserted disc 19 so that contact with the disc will initiate the cueing portion of the cycle, it is necessary to remove this microswitch 331 from such contact with disc immediately after it has performed its function. The rotation of bar 491 while depressing rail 121 to a lower position, simultaneously causes cueing microswitch 331 to swing away from and above its original position in contact with disc 19. The partial lowering of rail 121 also reduces to a minimum the distance subsequently required to lower clamping disc 111 to clamping position, and record-play head 131 to transducing position. The vertical clearance between the turntable 61 and the head and disc 111 must of course be quite large at the beginning of operation to allow for insertion of disc 19. The rotation of bar 491 also reduces the length of stroke of linear clamping solenoid 461 that is subsequently required when the solenoid must power the final clamping stroke, and this reduction of stroke permits the solenoid to operate within the range of its greatest power. Furthermore, the positioning of the above elements close to their ultimate positions reduces the inertial effects encountered the subsequent change to the play-record mode, and the time required for this change is minimized. Both of these factors are important in that they permit low operational noise level and very fast starting of the play-record mode, which latter is one of the major requirements of a machine used for the intended purpose.

The final clamping operation is normally initiated by the operator as later described, and the mechanical action begins with the powering of clamping solenoid 461. Link 471 is thus operated to rotate crank 481, causing depressor bar 491 to rotate, which in turn causes depressor 501 to depress rail 121 fully downward so that clamping disc 111 contacts magnetic disc 19 and presses it firmly to turntable 61, the result being to cause disc 19 to rotate with, and at the same speed as, turntable 61. The full lowering of rail 121 brings magnetic gap of record-play head 131 into contact with magnetic coating of disc 19 at the exact beginning of the recorded or recording spiral 42. The rotation of arm 481 also causes clockwise rotation of lifter 341 and raises cue bar 101 sufficiently so that the lower end of cue bar 101 is removed from cue slot 21 of disc 19, freeing disc 19 so it may rotate with turntable 61.

A further result of the rotation of depressor bar 491 to clamping position is the engagement of the clutch 161, 171. As shown in FIGURE 6, the worm gear assembly 151 includes a worm 763 mounted on the shaft 762, and a gear 764 formed integrally with the clutch member 161 and mounted for free rotation on a hollow shaft 765 that extends from a housing block 766. The block 766 is mounted on the rail 121 as by means of bolts 767, and ball thrust bearings 768 are positioned between the block and gear 764. The clutch member 171 is also mounted for free rotation on the shaft 765, and the confronting faces of the members 161, 171 are faced with rubber washers 769 for best frictional engagement. A resilient felt washer 772, impregnated with silicon fluid, is positioned between the clutch members and supplies lubrication to the assembly and acts to separate these members enough to disengage when the clutch is de-energized. The clutch member 171 has a cylindrical cam 773 extending from one end for controlling the electronic record equalization of the machine (later described), and the stop pin 601. The belt 181 is attached by means of a pin 774. To urge the clutch member 171 toward a disengaged position, a compression spring 775 is positioned between the end of shaft 765 and a cap member 776, which is coupled to the member 171 through a ball thrust bearing 777. The action of this spring also serves to hold shaft 778 and therefore pin 783 and lever 782 and roller 784 restrained to their proper positions. To move the clutch member 171 toward an engaged position with respect to member 161, a rod 778 is coupled to the cap member 776 by means of an adjustable lock nut assembly 779, and the rod 778 is extended through the central bore of shaft 765 to protrude at the other end of the assembly. A lever 782 is coupled to the protruding end of rod 778 as by means of a pin 783 in the rod, and operates to pull out the rod 778 against the resistance of spring 775. The lever 782 pivots on a fulcrum roller 784, which bears against the side of block 766. To guide the lever 782 in its pivoting motion, a cover plate 785 is fitted on the block 766, and has a pair of extension 786 bracketing and guiding the lever. The motive force for the lever 782 is provided by a tension spring 787 coupled to an arm 788 that extends from the depressor bar 491. Thus, the rotation of the depressor bar 491 to clamping position causes engagement of the clutch member 171 with the member 161 against the urging of spring 775, and the rotation of depressor bar 491 away from clamping position permits disengagement of clutch members 161, 171 under the influence of spring 775, and the resilient washer 772.

In the present invention, the mechanism is arranged for moving the head 131 along spiral track 42 using what is essentially digital coupling between head moving pulley 171 and disc 19, and a compensatory device (belt 181) has been provided to minimize the inaccuracies that may result from the effects of temperature and humidity changes upon the parts of the mechanism. The head 131 must properly track or coincide with spiral recording track 42 for timing accuracy, i.e., so that the message being recorded starts at a predetermined point on the disc, and so that the head in playback mode will engage the disc at the same predetermined point, at the exact beginning of the previously recorded message, without the delay resulting from starting too soon, or the loss of portions of the message resulting from starting too late. Another need for accurate tracking is to prevent signal loss or crosstalk between tracks. If the head in playback were to begin one-half revolution of disc 19 early or late, the gap of head 131 would be located exactly between two turns of the spiral track rather than exactly on this track, and would therefore receive signals of equal strength from both tracks.

As previously explained, the clamping of clamping disc 111 to the turntable and engagement of clutch 161, 171, causes the turntable to drive the worm gear 151 and to wind up the belt 181, drawing the head 141 slowly inward along a radius of the turntable. As head carrier 141 travels along rail 121 it draws with itself one end of a head carrier return spring 550, which assures proper motion of carrier 141 by preventing carrier 141 from overrunning belt 181, and by supplying sufficient back tension to hold belt 181 taut. Because of the long distance traveled by carrier 141 and to keep the tension gradient of return spring 550 low so as not to adversely affect the motion of carrier 141, the spring 550 is made as long as practicable. However because of space restrictions within the confines of the unit, the needed spring length is attained by using a reversing pulley 551. One end of spring 550 is attached to carrier 141, and the body of the spring is wrapped around the periphery of pulley 551 to give an approximately 180° reversal of direction of pull, and the other end of spring 550 is attached to a post 561 extending from rail 121. In this arrangement the spring 550, pulley 551, carrier 141 and rail 121 accomplish vertical motion simultaneously, so that such motion does not affect the tension of spring 550.

As shown in FIGURES 8, 9 and 10, the head carrier 141 is mounted on the rail 121 in such a way as to permit accurate adjustment of the plane of the head gap 560 so that this plane is always aligned along a radius of the disc 19 and is normal to the plane of the disc 19; and also so that the plane 562 of the head tip is always parallel to the plane of the disc 19. The head 131 is solidly mounted in a mounting block 563 that has a pair of low-friction plastic slide pads 564 permanently mounted on the upper face thereof. The upper surfaces are machined during manufacture to be in a plane precisely parallel to the plane 562 and serve as gauge surfaces to slidably engage the lower side of rail 121. The lower surface of rail 121 is maintained parallel to the plane of the turntable in the record-play position by means of a bottoming ledge 565 (FIGURE 4) on the mounting bracket 521, and by a pin 566 (FIGURE 1) that extends from the rail 121 through a vertical slot in the bridge 511 and bottoms on a vertically adjustable plate 567 that is mounted on the bridge. Thus the bottomed position of the rail 121 is established parallel to the plane of the turntable in the play-record position, as seen from the side (FIGURE 10), and it follows that the plane 562 is also parallel to the plane of the turntable when the pads 564 engage the rail 121. The penetration of the head into the disc 19 and the pressure exerted thereon, is established by adjusting the vertical height of the turntable with screw 284, previously described.

The manner in which the plane of the head gap 561 is established normal to the plane of the turntable, and along a radius thereof, is best explained by description of the mounting structure, as follows. The head mounting block 563 has a pair of vertical gauge surfaces 568 by which the block is positioned on corresponding gauge surfaces of the head carrier 141, and the block is secured to the carrier by means of a pair of threaded studs 569 extending from the carrier, and a pair of threaded nuts 570. The carrier 141 has an upward extension 572, lying along one vertical side of rail 121, and the extension 572 has a V-shape as seen from above (FIGURE 8). A triangular adjusting plate 573 is mounted on the extension 572, between the extension and the rail 121, with two corners of the plate 573 engaging the upper corners of the extension 572 and with the upper center portion of the plate spaced from the upper center portion of the extension and retained thereto by means of a spring loaded bolt 574 passing slidably through the extension 572 and threaded into the plate 573. The upper two corners of the plate have a pair of low-friction plastic pads 575 affixed thereto and engaging the side of the rail 121. The lower corner of the plate has a similar pad 576 engaging the lower portion of the side of the rail 121. A pair of set-screws 577, equipped with tension locking nuts, are threaded through the extension 572 and bear against the plate 573 directly behind the pads 575; and a third set-screw 578 is threaded through the extension 572 and bears against the plate 573 directly behind the pad 576. The entire assembly is held against the side and bottom of the rail, with the pads 564, 575 and 576 bearing against the rail, by means of a pair of tension springs 631 attached to a portion of carrier 141 and pulling upward and away from extension 572 as shown in FIGURE 9.

It will be seen that by adjusting all of the set-screws 577, 578 by equal or varying amounts, the plane of the head gap 561 may be aligned along a radius of the turntable; and by adjusting the set screw 578 alone, the plane of the head gap may be adjusted to be normal to the plane of the turntable. It will be seen that once such adjustments have been made for one assembly of head 131 and head mounting block 563, then another assembly of head and head block may be interchanged with the first, without need for correcting the adjustments.

The other ends of springs 631 are attached to a carrier spring slide yoke 621. Inasmuch as contact between carrier 141 and rail 121 is essentially a three point contact the attitude of springs 631 is such as to maintain approximately equal pressure of carrier 14 against the bottom and side of rail 121, there is no free play between these parts such as might otherwise result in erratic movements of the head 131, adversely affecting the performance of the machine. It is important that the tension of springs 631 remain constant throughout the travel of carrier 141 along rail 121, and the springs 631 are therefore arranged to move along with carrier 141. Yoke 621 is mounted on rollers on a slide bar 571, which is mounted parallel to rail 121, by means of two posts 561 extending from rail 121.

To provide for manual adjustment of the point at which the head begins to track, the stop pin 601 is attached to clutch member 171 and protrudes in such a manner that at one point of the rotation of member 171, pin 601 contacts, and is restrained by, one face of a stop collar 581, which is rigidly mounted on one end of slide bar 571. The end of bar 571 near collar 581 is threaded into a hole in the corresponding post 561, but passes freely through a hole similarly located in the other post 561. A locking screw 591 is threaded axially into the end of the other post 561 so that it contacts and clamps bar 571. Locking screw 591 may be loosened to release bar 571, which in turn may be rotated to screw into or out of the threaded post 561 at the threaded end of bar 571, shifting the location of collar 581 in relation to stop pin 601. In this manner the point where rotation of pulley 171 is stopped by collar 581, may be varied, and the point at which head tracking begins is radially adjusted. As previously mentioned, the belt 181 is made of the same material as the disc 19, so that with head 131 and carrier 141 correctly adjusted, any subsequent heat or humidity induced expansion or contraction of the disc 19 is at least partly matched by expansion or contraction of belt 181, permitting the radial starting position of head 131 and carrier 141 to vary automatically with starting point of spiral 41 on disc 19. However, the turn-to-turn radial spacing of the spiral 42 also varies with the expansion and contraction of disc 19, while the radial speed of movement of head 131 does not vary with the expansion or contraction of belt 181. Therefore, even though head 131 and the beginning of spiral 42 coincide, further compensation may be required to permit head 131 and carrier 141 to correctly follow or track the remainder of the spiral 42 inward towards the disc center. For this purpose, the pulley section of clutch 171 may also be made of the same material as the disc 19, with similar coefficients of expansion, so that expansion and contraction will vary the diameter of the pulley and the linear rate at which the belt 181 is wound onto the pulley surface. Alternatively, the error that results from use of a pulley of fixed diameter may be divided between the beginning and the end of the track by adjusting knob 581 to produce zero error at the midpoint of the track.

Referring now to the control circuit diagram of FIGURE 9, together with the figures previously described, the operation of the mechanism is further explained.

When the machine is first turned on as by the manual closing of an on-off switch 801, an alternating current line voltage is applied to a pair of control circuit power supplies 802 and 803 and to the motor 71. The power supply 803 immediately energizes the capstan-engaging solenoid 271 which engages the capstan with the turntable for driving same. The power supply 802 is used to power the cueing system as follows. When the disc 19 is inserted into the machine, it first passes the arm 321 in the latter's right-most position, with an associated microswitch 804 in closed state; and the complete insertion of the disc closes the switch 331 as previously described. The closing of the switch 331 completes a power circuit from supply 802 through a normally closed stop switch 806, a remote stop switch 807, a play contact 808 of a manually operated record-play mode selection switch 809 if the machine is in play mode, or through a record interlock contact 811 of a manual switch 812 if the machine is in record mode, and through an end-of-play switch 813, a relay 814, and a normally conducting switching transistor 816 to ground. Completion of this circuit energizes the relay 814, and the energization of the relay closes normally open contacts 817 thereof, completing a bypass circuit through the relay and stop switches to the power supply, and locking the relay into energized condition during all of the subsequent operating modes of the machine.

As a feature of the above described operation, it is noted that a safety interlock is provided to prevent unintentional re-recording of a disc that has been previously recorded. When the record-play manual selection switch 809 is turned to record position, a pair of contacts 818 of the switch are closed to energize a red warning light 819 that is energized directly from the power supply 802. Furthermore, when the switch 809 is in record position, the energizing circuit for the relay 814 cannot be completed unless the switch 812 is operated to close the circuit with its contact 811. The switch 812 is a two-way switch that is normally in an open central position as shown in the drawing, so that if an already recorded disc is inserted into the machine and the machine is in record mode, no recording operation will ensue until the operator makes the effort to operate the interlock switch 812. When this switch is operated to complete the circuit through its contact 811, it immediately returns to central position when it is released by the operator.

When the relay 814 is energized as above described it closes a normally open switch 821 that is coupled in series with the power supply 803, a normally colsed switch 820, and through cueing solenoid 421 to ground, thus energizing the cueing solenoid and initiating the cueing process as previously described. As one result of energization of the cueing solenoid, the depressor bar 491 is rotated, and the cue bar 101 is lowered to the surface of the disc 19. Upon descent of the cue bar, a microswitch 822 that is coupled to the cue bar for operation thereby, remains closed and provides a circuit from the power supply 803 to a cueing light 823 that indicates that the cueing process is going on. When the disc 19 comes to its cued position and the cue bar 101 drops through the opening 21 in the disc, the switch 822 is operated to break the circuit to the "cueing" light 823 and to complete an energizing circuit through a "ready" light 824, which indicates that the disc is cued and is ready to operate. It also provides a ground connection for clamping solenoid 461. This prevents the clamping solenoid from being energized if the start button is depressed before the disc is cued up. At this point nothing further happens until the operator is ready to proceed with recording or playing of the disc.

When the operator is ready, he manually pushes a normally open start switch 826, which completes a circuit from the power supply 803, through the still closed switch 821, the clamping solenoid 461, and the switch 822 to ground, thus initiating the clamping operation. Coupled in parallel with the clamping solenoid 461 is a "running" light 827 which is concurrently energized to indicate that the machine is in the play or record mode of operation, and a holding relay 828, which is energized to hold the clamping solenoid in energized condition. The holding relay 828 is coupled to the switch 820 to break the circuit to the cueing solenoid 421 and the "ready" and "cueing" lights, and to establish a direct circuit from the power supply 803 to the clamping solenoid 461; and the holding relay also closes a pair of normally open contacts 829 for bypassing the switch 822 and completing the circuit from the solenoid 461 to ground. The machine continues to run in either play or record mode until stopped by the operator, who operates the stop switch 806 which opens the circuit through relay 814, thus opening the contacts 821 and dropping out the solenoid 461 and the relay 828. Upon the dropping out of the solenoid 461, the main spring 539 returns the depressor bar 501 to its inoperative position, raising the head from the disc and disengaging the clutch, so that the head carriage 141 is returned by the spring 541 to its beginning position. The stop may be brought about automatically when the interior circumference of the record portion of the disc is reached as by engagement of the head carrier 141 with the end-of-play switch 813, opening the switch and dropping out the relay 814. The stop may also be brought about by the opening of the manual remote stop switch 807, which is provided along with a remote start switch 831 for operation of the apparatus from a remote station. The remote start switch 831 is coupled in parallel with the start switch 826, but need not be coupled to the apparatus if it is not desired to use the remote station. However, if the remote stop switch 807 is not to be used or coupled to the apparatus the exterior terminals to which it is coupled when in use must be bridged by a bridging conductor.

Figure 1:
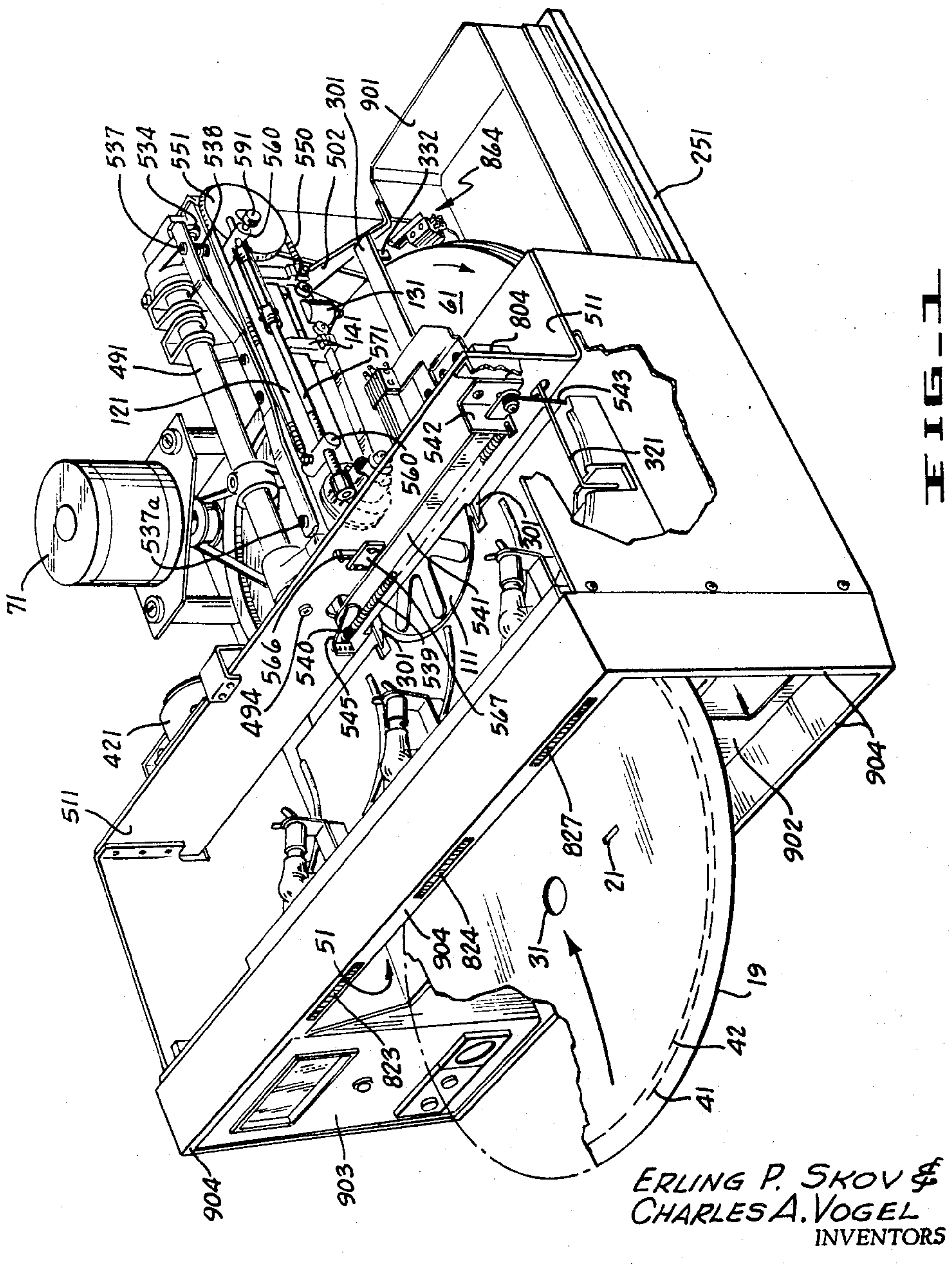
FIGURE 1 is a perspective of a magnetic disc recording machine constructed in accordance with the invention.

When the apparatus is stopped, it is usually desirable to avoid a recueing operation. It is noted that when the depressor bar 491 is returned to its inactive position, the switch 331 is returned to a position of engagement with the disc 19 and is reclosed. However, the switch 804 is still open, because the arm 321 was moved to the left by the slide 541 (as seen in FIGURE 1) during the record-play mode to open the switch 804, and the return of the slide 541 to the right at end of play does not move the arm 321 to the right nor reclose the switch 804. Thus a recueing circuit is not established. Removal of the disc 19 after the end of play, however, automatically causes movement of the arm 321 to the right and recloses the switch 804, while at the same time opening the switch 331, and the circuit is ready for a new cueing operation upon the insertion of another disc.

Under some circumstances, it may be desirable to leave the disc in the machine after playing and to automatically recue it for a repeat playing. If such an effect is desired, the switch 812 may be moved in the opposite direction to engage a contact 832 and to complete a circuit from the relay 814, bypassing the switches 804 and 331 and going through the play contact 808 of the switch 809 to the power supply 802. Thus, upon being stopped, the apparatus will recue the disc and remain in cued condition waiting a further decision to play. The switch 812 is so constructed that upon operation to engage the contact 832, it remains engaged until manually returned to central position. It is noted that recueing is performed only in the play mode.

The machine may also be stopped automatically at the end of a message that does not occupy the full length of the record track on the disc. Briefly, the arrangements for such action include the recording of a special 30-cycle signal upon the disc at the end of the recording process, when the stop button 806 is pressed, and the playing back of the signal from the disc during the play mode in such a way as to cause the dropping out of the relay 814. During the recording mode, the audio signal going into the head passes first through an amplifier 840 with a 30-cycle rejection filter to eliminate ordinary 30-cycle signals that might later cause spurious stopping of the machine, and through normally closed contacts 841 of the stop switch 806, an amplifier 842, and through a record contact 839 of the manual selection switch 809 to the head 131. Opening of the stop switch contacts 806 opens contacts 841 between the amplifiers 840 and 842 and closes contacts 841 between the amplifier 842 and a 30-cycle signal generator 843. A second pair of normally open contacts 844 of the stop switch 806 are closed subsequent to the closing of contacts 841 so as to insure a gradual rise of the amplitude of the 30-cycle signal and avoid the recording of a switching "click." When both switches are closed, the 30-cycle signal is fed through the switch 844 to an amplifier 846 with a 30-cycle emphasis filter to remove distortion from the signal and make it less audible, and thence to the switch 841 and the head 131 for recording on the disc. To make certain that the machine continues to operate after the opening of the stop switch, for a sufficiently long time to complete the recording of the 30-cycle signal, a capacitor 847 is coupled in parallel with the power supply 802 and stop switch 806 so as to be charged during the recording process, and to discharge through the relay 814 after the stop switch 806 is opened. During the record mode, the capacitor is thus coupled through a record contact 848 of the manual selection switch 809, and during the play mode, the capacitor is coupled directly to the power supply for charging only through a contact 849 of the switch 809. It will be seen that the capacitor 847 does not discharge so as to prolong the energization of relay 814 when the stop switch 806 is opened during play mode. For picking up the 30-cycle signal from the disc during the play mode, the head 131 is uncoupled from the recording circuits and is coupled to playback circuits through a play contact 851 of the manual selection switch 809 and thence to an equalized amplifier 852. The output from the equalized amplifier has a message signal output leading to a line amplifier 853 with a 30-cycle rejection filter and thence to a signal output 854. Thus the recorded 30-cycle signal is eliminated from the audio signal that is reproduced. The other output from amplifier 852 is coupled to an amplifier 856, a clipper 857, a level control circuit 858 and to an amplifier 859 with a 30-cycle emphasis filter. Thus only the 30-cycle signal gets through, and is fed directly to the relay switching transistor 816 so as to render the transistor nonconducting and to break the energizing circuit to relay 814. The machine is then returned automatically to its inoperative position as previously described.

It will be remarked that during the recording process as the head approaches the center of the disc, the relative speed between the recording medium and the head decreases. Such speed variation causes amplitude attenuation of various parts of the signal in proportion to the frequencies thereof. In other words the higher frequency portions of the signal suffer more attenuation than the lower frequency portions. To correct for this attenuation during the recording process, a resistance-capacitance circuit is provided, including a resistor 861 in series with the amplifier 842 and the head 131, and a plurality of capacitors 862 in parallel with the resistor 861 and with one another, but coupled only through a multiple leaf switch 863 that is operated by the cam 773 that protrudes from the end of the rotating clutch assembly previously described. As the cam rotates during the progress of the head toward the center of the disc, first one and then another of the capacitors 862 are coupled to the circuit, until when the head reaches the end of the track, all of the capacitors are operating in the circuit.

The muting arm 502 previously described is used to close a pair of coupled switches 864 when the depressor bar 491 is rotated to play position, but at the end of play when the depressor bar rotates to an inoperative position and the head is raised, the switches 864 are operated to cut off the output signal and with it any transient or background noises that may be picked up by the head during the stopping process. The muting switch contacts between amplifier 856 and clipper 857 serve to prevent automatic (30 c.p.s.) stop for messages of less than 5 sec. duration during the cueing operation.

The apparatus is arranged so that a number of complete recorder-reproducers may be connected to play sequentially and automatically. For example suppose that two such recorder-reproducers 871 and 872 are to be so arranged, with the machine 871 being played first and upon the termination of its play the machine 872 being set in operation. The machine 871 contains relay contacts 873 controlled by the holding relay 828 and has three exterior terminals coupled by conductors 874, 875 and 876 to an intermediate circuit 877 that is provided as an accessory for this use. The movable relay contact 873 is coupled within the circuit 877 through a resistor 878 to a capacitor 879 to ground, and a diode 881 is coupled in parallel with the resistor 878. The line 875 is connected directly through the circuit 877 to a terminal **882*a* on the machine 872, and the line 876 is connected through the circuit 877 to a terminal 883*a* on the machine 872. As will be seen from inspection of the circuits of machine 871, which has similar terminals 882 and 883 thereon, the terminals 882*a* are coupled to the respective relays 828 and 828*a* and the terminals 883, 883*a* are coupled directly to the respective power supplies 803, 803*a*. It will be understood that both of the machines are arranged before play with discs 19 inserted and cued. When the operator is ready to begin, he closes the start switch of machine 871, beginning the play process, and the switch 873 is thereupon operated by the relay 828 to couple the capacitor 879, through line 876 and terminal 883*a* of machine 872, to the power supply 803*a* of machine 872 for charging the capacitor. When the machine 871 comes to the end of its play and returns to inoperative position, the relay 828 thereof drops out and the relay contacts 873 are operated to couple the charged capacitor 879 through diode 881, line 875 and terminal 882*a* of machine 872 to the relay 828*a* thereof, thus bypassing the start switch of the machine 872 and initiating the playing process thereof. A third recorder can be connected in the same manner to the recorder 872** and so on.

The construction of the 30-cycle signal generator is illustrated in FIGURE 12. To obtain optimum performance of the filters, the 30-cycle tone must be accurately controlled. This effect is accomplished by locking the generator mechanically to the line frequency. A two pole ring magnet 891 is mounted on the shaft of drive motor 71. A pole piece 892 is mounted on the motor mounting plate 893, and forms an armature for a generator coil 894 wound thereon. Since the motor 71 is synchronous and has four poles, it will rotate at 1800 r.p.m. on a 60 c.p.s. line and provide 30 c.p.s. from a two pole rotor. Similarly a 900 r.p.m. motor on a 60 c.p.s. line will provide 30 c.p.s. from a four pole rotor.

As an important feature of the construction, the major portion of the electronic components are mounted in a sliding drawer 901 (FIGURE 1), which includes front panels 902 and 903 fitting at the edges within a cabinet-mounted frame 904 and against shoulders 905 (FIGURE 13) of the frame. The panel 902 is permanently affixed to the front portion of the drawer 901, but the panel 903 must be demountable to provide access to portions of the instruments mounted thereon when the drawer is pulled out. When the drawer is to be re-closed, the problem arises of re-mounting the panel 903 so that the edges thereof will fit snugly against the shoulders 905 of the frame. As shown in FIGURE 13, the side of the drawer is provided with a pair of horizontal slots 911 by which a tab 912 extending from the panel 903 is secured to the drawer, with bolts 913. The bolts 913 may be loosened to demount the panel. As a guide for re-mounting the panel in correct position, a guide plate 914 is secured to the side of drawer 901 by means of two bolts 915, which pass through enlarged slots 916 in the drawer side. The guide plate 914 may be pre-set to about the tab 912 so that the panel 903 is in correct relation to the drawer.

Subsequently, when the panel is remounted, it is necessary only to cause the tab 912 to abut the guide plate 914 and then to tighten the bolts 913. The panel is then correctly aligned on the drawer and will fit snugly against frame shoulders 905 when the drawer is in closed position.

Thus there has been described a structure into which a disc is inserted, tripping an automatic mechanism for cueing the disc, comprising a rotating turntable and a cueing bar that drops into a cueing hole in the disc when the disc has rotated to its correct position, thereafter holding the disc in this position. When the operator is ready, he initiates the recording or playing operation, causing the cueing bar to be lifted and the disc to be clamped solidly to the rotating turntable, while the transducing head is lowered to engage the disc, and a clutch is engaged to cause the head to move along a track toward the center of the disc, driven by the clamping system and the turntable.

What is claimed is:

1. In a disc recording and reproducing machine of the type including means for rotating said disc and transducing means moving in a radial path across said disc for recording and reproducing information in a spiral path on said disc, the combination comprising:

a member constituting said disc and having index means of substantial radial dimension formed thereon; and means cooperating with said index means to automatically align a predetermined sector of said disc member with said radial path of said transducing means when said disc member is placed on said machine;

whereby the beginning of said spiral path is always located at the same point on said disc member before operation of said machine in the recording and reproducing modes thereof.

2. A disc recording and reproducing machine, comprising:

a disc member having index means of substantial radial dimension formed thereon;

means for moving said disc member in rotation;

transducing means for recording and reproducing information on said disc member;

track means extending in a predetermined plane substantially radially across only one face of said disc member, said transducing means being mounted for radial sliding movement on said track means;

means for moving said transducing means in said radial movement on said track;

both of said moving means being coupled together for conjoint movement of said disc member and transducing means, so that said transducing means describes a spiral path on said disc member;

drive means coupled to at least one of said moving means for driving said disc member and transducing means in said conjoint movement; and means cooperating with said index means to automatically align a predetermined sector of said disc member with said transducing track means when said disc member is placed on said machine.

3. A disc recording and reproducing machine, comprising:

a disc member presenting an index edge of substantial radial dimension;

means for moving said disc member in rotation;

transducing means for recording and reproducing information on said disc member;

track means extending in a predetermined plane substantially radially across said disc member, said transducing means being mounted for radial sliding movement on said track means;

means for moving said transducing means in said radial movement on said track;

both of said moving means being coupled together for conjoint movement of said disc member and transducing means, so that said transducing means describes a spiral path on said disc member;

drive means coupled to at least one of said moving means for driving said disc member and transducing means in said conjoint movement; and means cooperating with said index edge to automatically align a predetermined sector of said disc member with said transducing track means when said disc member is placed on said machine.

4. A magnetic disc recording and reproducing machine, comprising:

a disc member formed of thin sheet material and having a central opening for centralization thereof, a clamping zone surrounding said opening, and a recording zone surrounding said clamping zone, at least one side of said member being coated with magnetic recording material at least in said recording zone, and said member having an index slot located in said clamping zone thereof and defining an index edge of substantial radial dimension facing in a first direction of rotation;

means for moving said disc member in rotation;

transducing means for recording and reproducing information on said disc member;

track means extending in a predetermined plane substantially radially across only one face of said disc member, said transducing means being mounted for radial sliding movement on said track means;

means for moving said transducing means in said radial movement on said track;

both of said moving means being coupled together for conjoint movement of said disc member and transducing means, so that said transducing means describes a spiral path on said disc member; drive means coupled to at least one of said moving means for driving said disc member and transducing means in said conjoint movement; and means cooperating with said index slot to automatically align a predetermined sector of said disc member with said transducing track means when said disc member is placed on said machine.

5. A magnetic disc recording and reproducing machine, comprising:

a disc member made partly of magnetic recording material and having index means of substantial radial dimension formed thereon;

a turntable having a frictional surface for engaging and moving said disc member in cueing rotation when said disc member is laid thereon;

drive means coupled to said turntable for rotatably driving same;

a magnetic transducer for recording and reproducing information on said disc member;

track means extending in a predetermined plane substantially radially across said disc member, said transducer being mounted for radial sliding movement on said track means;

means for moving said transducer in said radial movement on said track;

means cooperating with said index means to automatically stop said cueing rotation of said disc member upon alignment of a predetermined sector of said disc member with said transducer track means;

means for clamping said disc member to said turntable for positive rotation of said clamping means and disc member during recording and reproducing modes of operation of said machine; and means for coupling said clamping means and said transducer moving means for conjoint movement of said disc member and transducer, so that said transducer describes a spiral path on said disc member during said recording and reproducing modes of operation.

6. A magnetic disc recording and reproducing machine, comprising:

a disc member made partly of magnetic recording material and having index means of substantial radial dimension formed thereon;

a turntable having a frictional surface for engaging and moving said disc member in cueing rotation when said disc member is laid thereon;

drive means coupled to said turntable for rotatably driving same;

a magnetic transducer for recording and reproducing information on said disc member;

track means extending in a predetermined plane substantially radially across said turntable, said track means being mounted for movement in said plane toward and away from said turntable, said transducer being mounted for radial sliding movement on said track means;

means for moving said transducer in said radial movement on said track;

means cooperating with said index means to automatically stop said cueing rotation of said disc member upon alignment of a predetermined sector of said disc member with said transducer track means;

a clamping plate mounted for rotation on said track means about an axis coincident with the axis of said turntable;

means for causing movement of said track toward said turntable to clamp said clamping plate against said disc member and turntable and to bring said transducer into engagement with said disc member, said last-named means having control connections with said disc stopping means so that said last-named means is operable only after said disc has been cued and stopped, and upon operation of said last-named means said disc stopping means is inactivated to permit rotation of said disc;

means for coupling said clamping plate and said transducer moving means for conjoint movement of said disc member and transducer, so that said transducer describes a spiral path on said disc member during said recording and reproducing modes of operation.

7. A magnetic disc recording and reproducing machine, comprising:

a disc member made partly of magnetic recording material and having index means of substantial radial dimension formed thereon;

a turntable having a frictional surface for engaging and moving said disc member in cueing rotation when said disc member is laid thereon;

drive means coupled to said turntable for rotatably driving same;

a magnetic transducer for recording and reproducing information on said disc member;

track means extending in a predetermined plane substantially radially across said turntable, said track means being mounted for movement in said plane toward and away from said turntable, said transducer being mounted for radial sliding movement on said track means;

a rotatable drum mounted on said track and having wound thereon a belt extending to said transducer for drawing said transducer radially inwardly when said drum is rotated, and a tension spring coupled between said track and transducer for urging said transducer radially outwardly on said track;

means cooperating with said index means to automatically stop said cueing rotation of said disc member upon alignment of a predetermined sector of said disc member with said transducer track means;

a clamping plate mounted for rotation on said track means about an axis coincident with the axis of said turntable;

means for causing movement of said track toward said turntable to clamp said clamping plate against said disc member and turntable and to bring said transducer into engagement with said disc member, said last-named means having control connections with said disc stopping means so that said last-named means is operable only after said disc has been cued and stopped, and upon operation of said last-named means said disc stopping means is inactivated to permit rotation of said disc;

a clutch engageable by said track-moving means for coupling said clamping plate and said drum for conjoint movement of said disc member and transducer, so that said transducer describes a spiral path on said disc member during said recording and reproducing modes of operation.

8. A disc recording and reproducing machine, comprising:

a flexible disc member;

means for moving said disc member in rotation;

transducing means for recording and reproducing information on said disc member;

track means extending substantially radially across one face of said disc member, said transducing means being mounted for radial sliding movement on said track means;

a rotatable drum mounted on said track and having wound thereon a belt extending to said transducer for drawing said transducer in a first radial direction when said drum is rotated, and a spring coupled between said track and transducer for urging said transducer in the opposite radial direction on said track, said belt being made of the same material as said disc member;

said drum and said disc moving means being coupled together for conjoint movement of said disc member and transducing means, so that said transducing means describes a spiral path on said disc member;

drive means coupled to at least one of said moving means for driving said disc member and transducing means in said conjoint movement.

9. A magnetic disc recording and reproducing machine comprising:

a disc member made partly of magnetic recording material and having index means of substantial radial dimension formed thereon;

a turntable having a frictional surface for engaging and moving said disc member in cueing rotation when said disc member is laid thereon;

drive means coupled to said turntable for rotatably driving same;

a magnetic transducer for recording and reproducing information on said disc member;

track means extending in a predetermined plane substantially radially across said turntable, said track means being mounted for movement in said plane toward and away from said turntable, said transducer being mounted for radial sliding movement on said track means;

a rotatable drum mounted on said track and having wound thereon a belt extending to said transducer for drawing said transducer radially inwardly when said drum is rotated, and a tension spring coupled between said track and transducer for urging said transducer radially outwardly on said track;

means cooperating with said index means to automatically stop said cueing rotation of said disc member upon alignment of a predetermined sector of said disc member with said transducer track means;

a clamping plate having a shaft mounted for rotation on said track means about an axis coincident with the axis of said turntable, said shaft having a worm thread thereon;

a gear mounted for rotation on said track means and engaged by said worm thread;

means for causing movement of said track toward said turntable to clamp said clamping plate against said disc member and turntable and to bring said transducer into engagement with said disc member, said last-named means having control connections with said disc stopping means so that said last-named means is operable only after said disc has been cued and stopped, and upon operation of said last-named means said disc stopping means is inactivated to permit rotation of said disc; and a clutch engageable by said track-moving means for coupling said gear and said drum for conjoint movement of said disc member and transducer, so that said transducer describes a spiral path on said disc member during said recording and reproducing modes of operation.

10. A disc recording and reproducing machine, comprising:

a disc member having an eccentrically located index hole formed therein;

means for moving said disc member in rotation;

transducer means for recording and reproducing information on said disc member;

track means extending substantially radially across one face of said disc member, said transducing means being mounted for radial sliding movement on said track means;

a bar dimensioned to fit in said index hole of said disc;

means for holding said bar over said disc and for lowering said bar to engage said disc upon insertion of said disc in said machine; and means for urging said bar into said index hole upon said rotation of said disc for stopping said disc in a predetermined cued position.

11. A disc recording and reproducing machine, comprising:

a disc member having an eccentrically located index hole formed therein;

a turntable and drive means therefor, for moving said disc member in rotation;

transducing means for recording and reproducing information on said disc member;

track means extending substantially radially across one face of said turntable, said transducer means being mounted for radial sliding movement on said track means;

a bar dimensioned to fit in said index hole of said disc;

means for urging said bar toward said turntable at the radius of said index hole;

means for lifting said bar to permit insertion of said disc between said bar and turntable;

means engageable by said disc when said disc is centralized on said turntable for inactivating said bar-lifting means and permitting said bar to engage said disc and to enter said index hole upon initial rotation of said disc so as to stop said disc in a predetermined cued position; and means manually operable to start said machine in play-record mode and to re-activate said bar-lifting means to free said disc for play-record rotation.

12. A disc recording and reproducing machine, comprising:

a disc member having an eccentrically located index hole formed therein;

a turntable and drive means therefor, for moving said disc member in rotation;

transducing means for recording and reproducing information on said disc member;

track means extending substantially radially across one face of said turntable, said transducer means being mounted for radial sliding movement on said track means;

a bar dimensioned to fit in said index hole of said disc;

means for urging said bar toward said turntable at the radius of said index hole;

means for lifting said bar to permit insertion of said disc between said bar and turntable;

means engageable by said disc when said disc is centralized on said turntable for inactivating said bar-lifting means and permitting said bar to engage said disc and to enter said index hole upon initial rotation of said disc so as to stop said disc in a predetermined cued position; and means manually operable to start and operate said machine in play-record mode and to reactivate said bar-lifting means to free said disc for play-record rotation;

said starting and operating means also being coupled to said disc-engageable means for retraction of said disc-engageable means from engagement with said disc during operation thereof in said play record mode.

13. A disc recording and reproducing machine, comprising:

a disc member having an eccentrically located index hole formed therein;

a turntable and drive means therefor, for moving said disc member in rotation;

transducing means for recording and reproducing information on said disc member;

track means extending substantially radially across one face of said turntable, said transducer means being mounted for radial sliding movement on said track means;

a cueing bar dimensioned to fit in said index hole of said disc;

means for urging said bar toward said turntable at the radius of said index hole;

a rotatably mounted depressor bar having an arm extending therefrom, spring means urging said arm toward a first position of rotation, and solenoid means for moving said arm to second and third positions of rotation;

means operated by said arm in the first position thereof for lifting said cueing bar to permit insertion of said disc between said cueing bar and turntable;

means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and means manually operable to start and operate said machine in play-record mode and to cause operation of said solenoid means to rotate said arm to the third position and to operate said lifting means to lift said cueing bar to free said disc for play-record rotation;

said depressor bar being coupled to said disc-engageable means for retraction of said disc-engageable means from engagement with said disc in the second and third positions thereof.

14. A disc recording and reproducing machine, comprising:

a disc member having an eccentrically located index hole formed therein;

a turntable and drive means therefor, for moving said disc member in rotation;

transducing means for recording and reproducing information on said disc member;

track means extending substantially radially across one face of said turntable, said transducer means being mounted for radial sliding movement on said track means;

a cueing bar dimensioned to fit in said index hole of said disc;

means for urging said bar toward said turntable at the radius of said index hole;

a rotatably mounted depressor bar having an arm extending therefrom, spring means urging said arm toward a first position of rotation, and solenoid means for moving said arm to second and third positions of rotation;

means operated by said arm in the first position thereof for lifting said cueing bar to permit insertion of said disc between said cueing bar and turntable;

means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and means manually operable to start and operate said machine in play-record mode and to cause operation of said solenoid means to rotate said arm to the third position and to operate said lifting means to lift said cueing bar to free said disc for play-record rotation;

said depressor bar being coupled to said disc-engageable means for retraction of said disc-engageable means from engagement with said disc in the second and third positions thereof;

means manually operable to stop said machine and operating to de-energize said solenoid means to return said arm to first position; and means having a lost-motion connection with said arm for disabling said disc-engageable means upon movement of said arm to second and third positions and return to first position, said disabling means being engageable by said disc upon withdrawal thereof from said machine for deactivation to return said disc-engageable means to operative position.

15. A disc recording and reproducing machine, comprising:

a disc member having an eccentrically located index hole formed thereon;

a turntable and drive means therefor, for moving said disc member in rotation;

transducing means for recording and reproducing information on said disc member;

track means extending substantially radially across one face of said turntable, said transducer means being mounted for radial sliding movement on said track means;

a cueing bar dimensioned to fit in said index hole of said disc;

means for urging said bar toward said turntable at the radius of said index hole;

a rotatably mounted depressor bar having an arm extending therefrom, spring means urging said arm toward a first position of rotation, and solenoid means for moving said arm to second and third positions of rotation;

means operated by said arm in the first position thereof for lifting said cueing bar to permit insertion of said disc between said cueing bar and turntable;

means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and means manually operable to start and operate said machine in play-record mode and to cause operation of said solenoid means to rotate said arm to the third position and to operate said lifting means to lift said cueing bar to free said disc for play-record rotation;

said depressor bar being coupled to said disc-engageable means for retraction of said disc-engageable means for engagement with said disc in the second and third positions thereof;

means manually operable to stop said machine and operating to de-energize said solenoid means to return said arm to first position;

means manually operable to select the record and play modes of operation of said machine;

means coupled to said selection means, said stop means and said transducing means in the record mode of said machine for causing a signal of predetermined frequency to be recorded on said disc when said stop means is actuated; and means coupled to said selection means and to said transducing means for receiving said signal in the play mode of said machine and for de-energizing said solenoid means thereupon to stop said machine and to return said arm to first position.

16. A disc recording and reproducing machine, comprising:

a disc member having an eccentrically located index hole formed thereon;

a turntable and drive means therefor, for moving said disc member in rotation;

transducing means for recording and reproducing information on said disc member;

track means extending substantially radially across one face of said turntable, said transducer means being mounted for radial sliding movement on said track means;

a cueing bar dimensioned to fit in said index hole of said disc;

means for urging said bar toward said turntable at the radius of said index hole;

a rotatably mounted depressor bar having an arm extending therefrom, spring means urging said arm toward a first position of rotation, and solenoid means for moving said arm to second and third positions of rotation;

means operated by said arm in the first position thereof for lifting said cueing bar to permit insertion of said disc between said cueing bar and turntable;

means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and means manually operable to start and operate said machine in play-record mode and to cause operation of said solenoid means to rotate said arm to the third position and to operate said lifting means to lift said cueing bar to free said disc for play-record rotation;

said depressor bar being coupled to said disc-engageable means for retraction of said disc-engageable means from engagement with said disc in the second and third positions thereof;

means manually operable to stop said machine and operating to de-energize said solenoid means to return said arm to first position;

means manually operable to select the record and play modes of operation of said machine;

means coupled to said selection means, said stop means and said transducing means in the record mode of said machine for causing a signal of predetermined frequency to be recorded on said disc when said stop means is actuated;

means coupled to said selection means and to said transducing means for receiving said signal in the play mode of said machine and for de-energizing said solenoid means thereupon to stop said machine and to return said arm to first position; and means coupled to said solenoid means, and operable upon de-energization thereof, for connection to the solenoid means of a second machine for the energization thereof, whereby said second machine is sequentially set in operation.

17. A disc recording and reproducing machine, comprising:

a disc member having an eccentrically located index hole formed therein;
a turntable and drive means therefor, for moving said disc member in rotation;
transducing means for recording and reproducing information on said disc member;
track means extending substantially radially across one face of said turntable, said transducer means being mounted for radial sliding movement on said track means;
a cueing bar dimensioned to fit in said index hole of said disc;
means for urging said bar toward said turntable at the radius of said index hole;
a rotatably mounted depressor bar having an arm extending therefrom, spring means urging said arm toward a first position of rotation, and solenoid means for moving said arm to second and third positions of rotation;
means operated by said arm in the first position thereof for lifting said cueing bar to permit insertion of said disc between said cueing bar and turntable;
means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and
means manually operable to start and operate said machine in play-record mode and to cause operation of said solenoid means to rotate said arm to the third position and to operate said lifting means to lift said cueing bar to free said disc for play-record rotation;
said depressor bar being coupled to said disc-engageable means for retraction of said disc-engageable means from engagement with said disc in the second and third positions thereof;
means manually operable to stop said machine and operating to de-energize said solenoid means to return said arm to first position;
muting means coupled to said depressor bar for stopping the playing operation of said machine when said depressor bar returns to first position.

18. A disc recording and reproducing machine, comprising:
a disc member having an eccentrically located index hole formed thereon;
a turntable and drive motor means therefor, for moving said disc member in rotation;
transducing means for recording and reproducing information on said disc member;
track means extending substantially radially across one face of said turntable, said transducer means being mounted for radial sliding movement on said track means;
a cueing bar dimensioned to fit in said index hole of said disc;
means for urging said bar toward said turntable at the radius of said index hole;
a rotatably mounted depressor bar having an arm extending therefrom, spring means urging said arm toward a first position of rotation, and solenoid means for moving said arm to second and third positions of rotation;
means operated by said arm in the first position thereof for lifting said cueing bar to permit insertion of said disc between said cueing bar and turntable;
means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and
means manually operable to start and operate said machine in play-record mode and to cause operation of said solenoid means to rotate said arm to the third position and to operate said lifting means to lift said cueing bar to free said disc for play-record rotation;
said depressor bar being coupled to said disc-engageable means for retraction of said disc-engageable means from engagement with said disc in the second and third positions thereof;
means manually operable to stop said machine and operating to de-energize said solenoid means to return said arm to first position;
means manually operable to select the record and play modes of operation of said machine;
means coupled to said selection means, said stop means and said transducing means in the record mode of said machine for causing a signal of predetermined frequency to be recorded on said disc when said stop means is actuated;
said last-named means including a magnet driven in rotation by said drive motor means, and an electrical coil positioned in the field of said magnet, whereby electrical pulses related in frequency to the rotational frequency of said motor are produced; and
means coupled to said selection means and to said transducing means for receiving said signal in the play mode of said machine and for deenergizing said solenoid means thereupon to stop said machine and to return said arm to first position.

19. A disc recording and reproducing machine, comprising:
a disc member having an eccentrically located index hole formed therein;
a turntable and drive means therefor, for moving said disc member in rotation;
transducing means for recording and reproducing information on said disc member;
track means extending substantially radially across one face of said turntable, said transducer means being mounted for radial sliding movement on said track means;
a cueing bar dimensioned to fit in said index hole of said disc;
means for urging said bar toward said turntable at the radius of said index hole;
a rotatably mounted depressor bar having an arm extending therefrom, spring means urging said arm toward a first position of rotation, and solenoid means for moving said arm to second and third positions of rotation;
means operated by said arm in the first position thereof for lifting said cueing bar to permit insertion of said disc between said cueing bar and turntable;
means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and
means manually operable to start and operate said machine in play-record mode and to cause operation of said solenoid means to rotate said arm to the third position and to operate said lifting means to lift said cueing bar to free said disc for play-record rotation;
said depressor bar being coupled to said disc-engageable means for retraction of said disc-engageable means from engagement with said disc in the second and third positions thereof;
means manually operable to stop said machine and operating to de-energize said solenoid means to return said arm to first position;
means having a lost-motion connection with said arm for disabling said disc-engagement means upon movement of said arm to second and third positions and return to first position, said disabling means being engageable by said disc upon withdrawal thereof from said machine for deactivation to return said disc-engageable means to operative position; and manually operable re-cueing means having an inoperative position and an operative position causing direct energization of said solenoid means to cause movement of said arm to second position upon each return of said arm to first position.

20. A disc recording and reproducing machine, comprising:

a disc member having an eccentrically located index hole formed therein;

a turntable and drive means therefor, for moving said disc member in rotation;

transducing means for recording and reproducing information on said disc member;

track means extending substantially radially across one face of said turntable, said transducer means being mounted for radial sliding movement on said track means;

a cueing bar dimensioned to fit in said index hole of said disc;

means for urging said bar toward said turntable at the radius of said index hole;

a rotatable mounted depressor bar having an arm extending therefrom, spring means urging said arm toward a first position of rotation, and solenoid means for moving said arm to second and third positions of rotation;

means operated by said arm in the first position thereof for lifting said cueing bar to permit insertion of said disc between said cueing bar and turntable;

means engageable by said disc when said disc is centralized on said turntable for causing operation of said solenoid means to rotate said arm to the second position and to operate said lifting means to permit said cueing bar to engage said disc and to enter said index hole upon initial rotation of said disc so as to stop said disc in a predetermined cued position; and means manually operable for selecting the record and play modes of operation of said machine and including a manually operable record interlock means having an inoperative position overriding said disc-engageable means and preventing the energization of said solenoid means, and an operative position permitting the energization of said solenoid means;

means manually operable to start and operate said machine in play-record mode and to cause operation of said solenoid means to rotate said arm to the third position and to operate said lifting means to lift said cueing bar to free said disc for play-record rotation;

said depressor bar being coupled to said disc-engageable means for retraction of said disc-engageable means from engagement with said disc in the second and third positions thereof.

21. A magnetic disc recording and reproducing machine, comprising:

a disc member made partly of magnetic recording material and having index means of substantial radial dimension formed thereon;

a turntable having a frictional surface for engaging and moving said disc member in cueing rotation when said disc member is laid thereon;

drive means coupled to said turntable for rotatably driving same;

a magnetic transducer for recording and reproducing information on said disc member;

track means extending in a predetermined plane substantially radially across said turntable, said track means being mounted for movement in said plane toward and away from said turntable, said transducer being mounted for radial sliding movement on said track means;

a rotatable drum mounted on said track and having wound thereon a belt extending to said transducer for drawing said transducer radially inwardly when said drum is rotated, and a tension spring coupled between said track and transducer for urging said transducer radially outwardly on said track;

means cooperating with said index means to automatically stop said cueing rotation of said disc member upon alignment of a predetermined sector of said disc member with said transducer track means;

a clamping plate having a shaft mounted for rotation on said track means about an axis coincident with the axis of said turntable, said shaft having a worm thread thereon;

a gear mounted for rotation on said track means and engaged by said worm thread;

means for causing movement of said track toward said turntable to clamp said clamping plate against said disc member and turntable and to bring said transducer into engagement with said disc member, said last-named means having control connections with said disc stopping means so that said last-named means is operable only after said disc has been cued and stopped, and upon operation of said last-named means said disc stopping means is inactivated to permit rotation of said disc;

a clutch engageable by said track-moving means for coupling said gear and said drum for conjoint movement of said disc member and transducer, so that said transducer describes a spiral path on said disc member during said recording and reproducing modes of operation; and means for varying the record equalization of said machine and cam and cam follower means coupled thereto and to said drum for operating said equalization varying means as a function of the radial position of said transducer.

22. A magnetic disc recording and reproducing machine, comprising:

a disc member made partly of magnetic recording material and having index means of substantial radial dimension formed thereon;

a turntable having a frictional surface for engaging and moving said disc member in cueing rotation when said disc member is laid thereon;

drive means coupled to said turntable for rotatably driving same;

a magnetic transducer for recording and reproducing information on said disc member;

track means extending in a predetermined plane substantially radially across said turntable, said track means being mounted for movement in said plane toward and away from said turntable, said transducer being mounted for radial sliding movement on said track means;

means for moving said transducer in said radial movement on said track;

means cooperating with said index means to automatically stop said cueing rotation of said disc member upon alignment of a predetermined secetor of said disc member with said transducer track means;

a clamping plate mounted for rotation on said track means about an axis coincident with the axis of said turntable;

said clamping plate having a plurality of openings therein peripherally arranged, a corresponding plurality of gripping tooth elements mounted in said openings for yieldably engaging said disc, a spring mounted on said plate for urging said tooth elements toward said turntable, and said turntable having a yieldable portion opposite said tooth elements;

means for causing movement of said track toward said turntable to clamp said clamping plate against said disc member and turntable and to bring said transducer into engagement with said disc member, said last-named means having control connections with said disc stopping means so that said last-named means is operable only after said disc has been cued and stopped, and upon operation of said last-named means said disc stopping means is inactivated to permit rotation of said disc;

means for coupling said clamping plate and said transducer moving means for conjoint movement of said disc member and transducer, so that said transducer describes a spiral path on said disc member during said recording and reproducing modes of operation.

23. A disc recording and reproducing machine, comprising:

a disc member having a central positioning hole and index means of substantial radial dimension formed thereon;

a turntable for mounting said disc and moving said disc in rotation, said turntable having a compliant rim and a central shaft terminating in a rounded positioning stud engageable with said positioning hole of said disc, and a spider spring mounted on said turntable and having inwardly extending spring arms terminating near the tip of said stud for guiding said disc over said stud upon insertion, and adjustable thrust bearing means for said shaft for adjusting the vertical positions of said turntable;

motor means for driving said turntable;

a capstan and flywheel driven by said motor means and pivotably mounted for engagement with the rim of said turntable for driving same, and for retraction to avoid producing a flat on said rim;

transducing means for recording and reproducing information on said disc member;

stationary track means extending substantially radially across only one face of said disc member, said transducing means being mounted for radial sliding movement on said track means;

means for moving said transducing means in said radial movement on said track;

both of said moving means being coupled together for conjoint movement of said disc member and transducing means, so that said transducing means describes a spiral path on said disc member;

drive means coupled to at least one of said moving means for driving said disc member and transducing means in said conjoint movement; and means cooperating with said index means to automatically align a predetermined sector of said disc member with said transducing track means when said disc member is placed on said machine.

24. A magnetic disc recording and reproducing machine, comprising:

a disc member made partly of magnetic recording material and having index means of substantial radial dimension formed thereon;

a turntable having a frictional surface for engaging and moving said disc member in cueing rotation when said disc member is laid thereon;

drive means coupled to said turntable for rotatably driving same;

a magnetic transducer for recording and reproducing information on said disc member;

track means extending in a predetermined plane substantially radially across said turntable, said track means being mounted in a pair of guides for movement in said plane toward and away from said turntable, said transducer being mounted for radial sliding movement on said track means;

means for moving said transducer in said radial movement on said track;

means cooperating with said index means to automatically stop said cueing rotation of said disc member upon alignment of a predetermined sector of said disc member with said transducer track means;

a clamping plate mounted for rotation on said track means about an axis coincident with the axis of said turntable;

means for causing movement of said track toward said turntable to clamp said clamping plate against said disc member and turntable and to bring said transducer into engagement with said disc member, said last-named means having control connections with said disc stopping means so that said last-named means is operable only after said disc has been cued and stopped, and upon operation of said last-named means said disc stopping means is inactivated to permit rotation of said disc;

means for coupling said clamping plate and said transducer moving means for conjoint movement of said disc member and transducer, so that said transducer describes a spiral path on said disc member during said recording and reproducing modes of operation.

References Cited

UNITED STATES PATENTS

| | | | |
|---|---|---|---|
| 893,277 | 7/1908 | Stuart | 179—100.2 |
| 3,074,724 | 1/1963 | Fujimoto | 179—100.2 |

BERNARD KONICK, *Primary Examiner.*

J. R. GOUDEAU, *Assistant Examiner.*